United States Patent
Camacho et al.

(10) Patent No.: US 12,391,895 B2
(45) Date of Patent: Aug. 19, 2025

(54) SUPRAMOLECULAR SURFACTANTS WITH DETERGENT-DISPERSANT AND CORROSION INHIBITOR PROPERTIES

(71) Applicant: Instituto Mexicano del Petróleo, Mexico City (MX)

(72) Inventors: Ricardo Cerón Camacho, Mexico City (MX); Raúl Oviedo Roa, Mexico City (MX); Jorge Francisco Ramírez Pérez, Mexico City (MX); Enrique Soto Castruita, Mexico City (MX); Rodolfo Cisneros Dévora, Mexico City (MX); David Aaron Nieto Álvarez, Mexico City (MX); José Manuel Martínez Magadan, Mexico City (MX); Ana Graciela Servín Nájera, Mexico City (MX); Luis Silvestre Zamudio Rivera, Mexico City (MX)

(73) Assignee: Instituto Mexicano del Petróleo, Mexico City (MX)

( * ) Notice: Subject to any disclaimer, the term of this patent is extended or adjusted under 35 U.S.C. 154(b) by 18 days.

(21) Appl. No.: 18/205,261

(22) Filed: Jun. 2, 2023

(65) Prior Publication Data
US 2023/0399576 A1    Dec. 14, 2023

(30) Foreign Application Priority Data
Jun. 8, 2022    (MX) ............. MX/a/2022/06983

(51) Int. Cl.
*C10L 10/04* (2006.01)
*C09K 15/20* (2006.01)
*C09K 15/30* (2006.01)

(52) U.S. Cl.
CPC ............. *C10L 10/04* (2013.01); *C09K 15/20* (2013.01); *C09K 15/30* (2013.01)

(58) Field of Classification Search
CPC ........... C09K 15/20; C09K 15/30; C10L 1/14; C10L 1/143; C10L 1/1608; C10L 1/1616;
(Continued)

(56) References Cited

U.S. PATENT DOCUMENTS

| | | | |
|---|---|---|---|
| 2010/0107478 A1* | 5/2010 | Zamudio Rivera .. | C07D 413/06 548/215 |
| 2015/0112096 A1* | 4/2015 | Hernandez Altamirano ............... | C10L 1/2222 562/571 |

OTHER PUBLICATIONS

Haav et al. "Accurate Method to Quantify Binding in Supramolecular Chemistry". The Journal of Organic Chemistry. Jul. 15, 2013. 78. pp. 7796-7808. (Year: 2013).*

(Continued)

*Primary Examiner* — Latosha Hines
(74) *Attorney, Agent, or Firm* — FisherBroyles, LLP; Jason P. Mueller

(57) ABSTRACT

The present invention relates to supramolecular surfactants (SS) with detergent-dispersant of heavy organic compounds (deposits and/or organic scales) and corrosion inhibition properties, and methods for preparing these surfactants. The invention also relates to the corresponding uses and applications of these surfactants to prevent and control the formation of deposits in internal combustion machines, as well as to prevent and protect pipelines, tanks, motors and complements of ferrous materials against corrosion where there is contact with liquid hydrocarbons such as gasoline, turbosine, and diesel, where gasoline may contain oxygenated compounds such as ethers and/or alcohols. The supramolecular surfactants are obtained from the self-assembly process between oxazolidines derived from polyalkyl/polyalkenyl N-hydroxyalkyl succinimides with alkyl/alkenyl-amine-propanoic acids and alkyl/alkenyl-amine-di-propanoic acids. The concentration of supramolecular (Continued)

Backlighting

Pending drop surfactants in liquid fuels is quantified through a process based on determining the interfacial tension in a fuel/water/supramolecular surfactant system.

6 Claims, 9 Drawing Sheets

(58) Field of Classification Search
CPC ........ C10L 1/201; C10L 1/2222; C10L 1/233; C10L 1/2383; C10L 10/04; C10L 2200/0254; C10L 2200/0423; C10L 2270/023
See application file for complete search history.

(56) References Cited

OTHER PUBLICATIONS

J. Bennett, "Advanced fuel additives for modern internal combustion engines", doi: 10.1533/9780857097422.1.165, 30 pages, 2014.
ATC, "Fuel Additives: Use and Benefits", 68 pages, Sep. 2013.
Nace International, "Standard Test Method, Determining Corrosive Properties of Cargoes in Petroleum Product Pipelines", Item No. 21204, 9 pages, Revised 2001.
Pons et al., "Supramolecular Chemistry", Encyclopedia of Nuclear Magnetic Resonance, vol. 9: Advances in NMR, (ISBN 0471 49082 2), 12 pages, 2002.
Sundaram et al., "Chapter 15: Molecular Design of Fuel Additives", Computer Aided Molecular Design: Theory and Practice, 25 pages, 2003.

* cited by examiner

SUPRAMOLECULAR SURFACTANTS WITH DETERGENT-DISPERSANT AND CORROSION INHIBITOR PROPERTIES

CROSS REFERENCE TO RELATED APPLICATIONS

This application claims priority under 35 USC 119 of Mexican patent application no. MX/A/2022/006983, filed in the Mexican Patent Office on Jun. 8, 2022.

DESCRIPTION

Technical Field of the Invention

The present invention relates to supramolecular surfactants with detergent-dispersant of heavy organic compounds (deposits and/or organic scales) and corrosion inhibition properties, and processes for preparing these surfactants. Likewise, the corresponding use of these surfactants to prevent and control the deposit formation in internal combustion machines, as well as to prevent and protect against the corrosion of pipes, tanks, engines, and complements of ferrous materials wherein are in contact with liquid hydrocarbons such as gasoline, turbosine, and diesel, wherein the gasoline can contain it oxygenated compounds such as ethers and/or alcohols.

Background of the Invention

Worldwide there is a great demand for liquids derived from petroleum, among which are liquid fuels, which generally contain in their composition compounds that have heteroatoms such as nitrogen and sulfur in their chemical structure, as well as olefinic compounds. Which when are in contact with atmospheric oxygen are polymerizing, giving rise to the formation of gums and organic deposits, which during transport and storage of the fuel, can cause soiling problems. It also is important to mention the corrosion problems that can cause these liquid fuels during their storage and transport by pipeline systems, tanks, and pumps that have a ferrous metal composition (several steel types), due to being exposed to an environment with oxygen, and to a presence of sulfurated derivatives, oxygenated additives like a methyl-terbutyl ether (MTBE) and ter-amyl methyl ether (TAME), alcohols (ethanol, methanol, isopropanol, butanol, etc.), or inclusive emulsions with water. It is important to remark that the corrosion problems in storage tanks, pipes, and parts of motor vehicles that are in contact with liquid fuels such as gasoline that contains oxygenated additives such as methanol and ethanol are increased significantly (H. Jafari, M. H. Idris, A. Ourdjini, H. Rahimi, B. Ghobadian. Fuel 2011, 1181-1187; M. H. Nandhakrishnan, S. P. Thakare Journal of Chemical Technology and Metallurgy, 55, 6, 2020, 2187-2196).

Given that the use of liquid hydrocarbons is fundamental in several industries, such as the oil industry and automotive, have been necessary to develop technological solutions to control the previously mentioned problems and enhance the properties of liquid derived from hydrocarbons produced. The market has surged chemical additives with a specific action (Fuel Additives: Use and Benefits. ATC document 113, September 2013; J. Bennett. Advanced fuel additives for modern internal combustion engines. In Alternative Fuels and Advanced Vehicle Technologies. 2014, 165-194), among which are: octane/cetane number enhancing, flow improvers, metal deactivators, markers or dyes, lubricity enhancers, friction modifiers, demulsifiers, dispersants, corrosion inhibitors, and detergents with or without co-detergents.

Exist different combinations or additives packages designed or selected to provide enhancement of the engine performance. Many of these packages permit differentiated hydrocarbon blends or fuels which are applied and highlight the features to be enhanced; for example, they can be employed in automotive. In addition, a deposit control agent can be combined with a corrosion inhibitor and a demulsifier additive in these additive packages, which is done to these packages as "multifunctional". Besides, the combination or mixture of these packages is markedly influenced by national or regional legislations and demand, consumption, perception, and environmental point of view (Fuel Additives: Use and Benefits. ATC document 113, September 2013). It should be noted that said formulations or compositions do not guarantee that the additives go to or act in the site wherein they have required his functionality since often these blends or compositions could have limited functionality according to operation conditions or their composition.

On the other hand, supramolecular surfactants (also called super-amphiphiles) are those obtained through self-assembly among molecules with surface properties (surfactants or detergents). The physicochemical properties of the supramolecular surfactants are differentiated by each separate component, which allows for obtaining a chemical with identity and enhanced functional parameters. In comparison with a conventional surfactant, a supramolecular surfactant is formed, besides the covalent intramolecular interactions in the components, by non-covalent intermolecular interactions among these, i.e., electrostatic interactions, ion-dipole, dipole-dipole, Van der Waals forces, hydrogen bonds, $\pi$-$\pi$ interactions, and charge transfer, which take place to host-guest interactions (X. Zhang, C. Wang. Chem. Soc. Rev. 2011, 40, 94-101). To prepare a supramolecular surfactant, it is not only necessary to combine two surfactants but also combines the adequate hydrophobic and hydrophilic properties to create new amphiphilic features through non-covalent interactions that permit obtaining a final product with different physicochemical properties. Due to the intramolecular interactions being non-covalent, the supramolecular surfactants have the capacity to self-assembly and disassemble, enhancing their functions, which allows a competitive advantage concerning conventional mixtures (L. Garcia-Rio, N. Basilio. Curr. Opin. Colloid Interface Sci. 2019, 44, 225-237).

As far as we know, not exist commercial mixtures or additive compositions for hydrocarbons or liquid fuels that have the characteristic of being supramolecular. However, some inventions employ the term composition, formulation, or synergistic additive surfactant mixture (also called detergents), together with corrosion inhibitors that have applications in hydrocarbons or liquid fuels, as described following.

The European patent EP1411105B9 mention additive composition for fuels effectiveness in the reduction of intake valve deposits in internal combustion engines, which comprise a detergent obtained through a Mannich reaction, a fluidizer of polyether, and a detergent of succinimide prepared by the reaction of a polyamine and a succinic acylating agent substituted with hydrocarbyl.

The U.S. Pat. No. 10,457,884 B2 is about composition to controlling intake valve deposits in engines operating unleaded gasoline fuel. Said composition is an additive package for fuels, which includes a mixture of two Mannich detergents; the first detergent is a di- or polyamine derivative, and the second detergent is a monoamine derivative, and both are in a weight ratio from 1:6 to 3:1. Said composition employs a carrier fluid which is nonyl phenol propoxylated or alcohol propoxilated with 30 mol of propylene oxide; also is used an antiwear agent derived from succinimide anhydride and ammonia, other antiwear that consist of an alkanol amide derived from diethanol amine and oleic acid and a polyisobutenyl succinimide detergent derived from tetraethylen pentaamine. The composition has also been tested in fuel with ethanol, from 1 to 20% in volume.

The international patent request WO2020172001A1 mentions a multifunctional composition of additives for a variety of applications, which include but are not limited to corrosion inhibitors, friction modifiers in aqueous and non-aqueous media, deposit control agents, dispersants of pigments, asphalts, and types of cement, and as a detergent; likewise, it can also be used in hydrocarbon fuels. The additive is obtained from the reaction between maleic anhydride and a polyoxyalkylene monoamine and a primary amine and/or a secondary amine, and a solvent and a surfactant or auxiliary. The patent establishes that the multifunctional additive performs according to its composition, which must be between 1.5:1 to 1:1.5 mol between amine and maleic anhydride, and its active concentration ranges from 0.001% to 40% by weight.

The Canadian patent CA2768903C treats a composition of an anti-corrosion detergent for cleaning dental and medical instruments, particularly the carrying process of a cleaner for cleaning and corrosion protection of these metallic instruments. The active ingredients of the composition are: a surfactant of 0.005% to 10% of a polyoxyethylene/polyoxypropylene block copolymer with a molecular weight of 1,500 to 8,500 g/mol, where less than 30% is polyoxypropylene, a corrosion inhibitor present in 0.005% to 10% of alkyl pyrrolidone ($C_4$-$C_{16}$) or alkyl amines ($C_1$-$C_{18}$); and a metal sequester. Said invention only reveals the composition and a washing method for metallic materials, where it is mentioned that the detergent composition leaves the instruments with low corrosion residues.

U.S. Pat. No. 5,612,295 mentions a multifunctional additive of lubricating viscosity for oils. Some of its properties are: it acts as a demulsifier, corrosion inhibitor for copper, antiwear, and lubricant; it is soluble in oil and disperses nitrogen-based ash; it employs an alkoxylated alcohol of up to 8 carbon atoms; and it has an oxyacid or anhydride derivative of phosphorus. In the additive mixture can be used the dispersants HiTec® 2605 (additive based on a Mannich dispersant), HiTec® 7100 (succinimide ester dispersant), HiTec® 646 (dispersant as Mannich base of tetraethylene pentamine succinimide substituted, with polyisobutylene, with a molecular weight of 1,300 g/mol), HiTec® 634 (dispersant formed by a succinimide made up of polyisobutenyl succinic anhydride with a molecular weight of between 850 and 1,000 g/mol and triethylenetetramine in a molar ratio of 1.8 to 1), HiTec® 645 (Dispersant made of polyisobutenyl succinic anhydride with a molecular weight between 850 and 1,000 g/mol and triethylenetetralin in a ratio of 1.6 to 1, and Sterox ND (ethoxylated alkyl phenol). The additive is a mixture of HiTec® detergent with ethoxylated lauryl alcohol, phosphoric acid, boric acid, and tolyl triazole.

The U.S. Pat. No. 5,612,296 mentions using propylene polymers as ash dispersants in oily media, lubricants, hydrocarbon fuels, as well as middle distillate fuels.

The US request patent US200914326A1 treats a composition to improve the economy of fuel performance in engine oils through the use of detergents, dispersants, friction inhibitors, antioxidants, viscosity modifiers, corrosion inhibitors, antifoams, and their mixtures of commercial compounds.

The Korean patent request KR20060111420A treats a composition and a method for controlling deposits in internal combustion engines. Among the components are: mineral oil, polyalphaolefin oligomers, and polyoxyalkylene compounds with molecular weights between 500 and 3,000 g/mol. The composition also uses dispersants/detergents, antioxidants, carriers, metal deactivators, antiknock agents, corrosion inhibitors, demulsifiers, and lubricity enhancers, among other components. The detergent component is an amine with at least one of the following ingredients: succinic anhydride derivatives with hydrocarbyl substitutions, Mannich condensation products, as well as hydrocarbyl amines and polyether amines.

The Mexican patent MX269419B relates to oxazolidines derived from polyalkyl or polyalkenyl N-hydroxyalkyl succinimides that control the formation of deposits in internal combustion machines. Likewise, the Mexican patent MX319760B refers to the process for obtaining and using N-alkyl or N-alkenyl or N-cycloalkyl, or N-aryl amino or imino propionic acids, as well as their compounded formulations with polyethers or copolymers derived from ethylene oxide or propylene oxide and an aromatic solvent, diesel or gasoline or alcohols, that inhibit the corrosion of ferrous metals in pipelines and tanks that store and transport crude oil, as well as combustible liquids such as un-desulphurized primary gasoline with low sulfur content, alkylated gasoline, turbosine or diesel in the presence of acid contaminants and water in environments exposed to oxygen.

The Chinese patent request CN105647619A is related to preparing lubricating oil that can be used in engines, with the ability to save energy and is environment friendly. The invention mentions that the manufacturing method is simple and has the ability to save fuel, reduce emissions, and have an antioxidant and dispersant cleaning effect. The lubricating oil is characterized by being made up of base oil, an antioxidant, a detergent, a dispersant, a rust inhibitor, a metal deactivator, a viscosity index improver, and other components. The detergent is sulfonated petroleum, the dispersant is succinate, and the rust inhibitor is imidazoline.

As seen in the inventions mentioned above, there is no evidence of the preparation or use of supramolecular surfactants that have an application to the technical field of the present document. Therefore, the present invention focuses on the obtaining process of supramolecular surfactants with detergency-dispersant properties for solids, deposits, and/or organic scales and corrosion inhibitors and their use in liquid fuels derived from hydrocarbons, as well as their mixtures with oxygenated agents; by acting synergistically, all these properties are improved and differentiated in such a way that they provide multifunctionality to the supramolecular surfactant, which represents an advantage over existing synergistic mixtures, additive packages, and existing compositions.

Unlike the previously mentioned documents, the present invention is related to new supramolecular surfactants with detergent-dispersant properties of organic compounds (deposits and/or organic scales) and corrosion inhibitors, as well as obtention process and use of them to prevent and control the formation of deposits in internal combustion machines, in addition to preventing and protecting pipelines, tanks, engines, and complements of ferrous materials wherein are in contact with liquid hydrocarbons such as gasoline, turbosine, and diesel, wherein the gasoline can contain it oxygenated compounds such as ethers and/or alcohols.

Therefore, the object of the present invention is to provide new supramolecular surfactants with multifunctional properties, i.e., simultaneously, it presents detergent, dispersant, and corrosion inhibitor properties, which in synergy act in improved and differentiated ways concerning mixtures, additive packages, and existing compositions. Another aim of the present invention is to provide a process for obtaining new supramolecular surfactants derived from the self-assembly of polyalkyl/polyalkenyl N-hydroxyalkyl succinimides with alkyl/alkenyl-amine-propanoic acids and alkyl/alkenyl-amine-di-propanoic acids through non-covalent interactions, whose process is based on green chemistry since it does not use solvents.

And another additional goal is to propose the use of new supramolecular surfactants to control the formation of deposits in internal combustion machines, in addition to preventing the corrosion of pipes, tanks, engines, and metallic ferrous components, where there is contact with liquid fuels derived from hydrocarbons such as gasoline, which can be quantified through interfacial tension measurements of a water-fuel system.

BRIEF DESCRIPTION OF THE DRAWINGS

With the aim to have a better understanding of the supramolecular surfactants with detergent-dispersant and corrosion-inhibiting properties of the present invention, accompanying drawings are provided that are briefly described below.

DETAILED DESCRIPTION OF THE INVENTION

Figure 1:
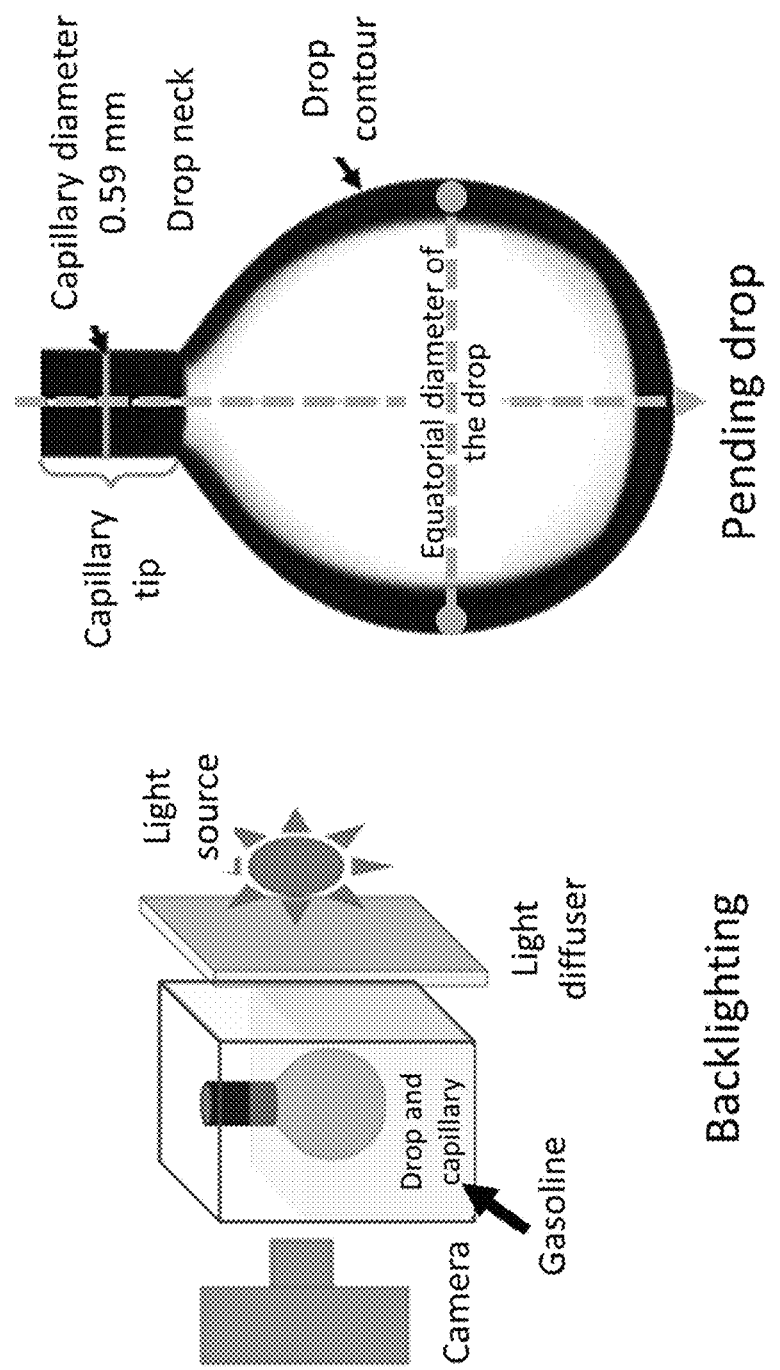
FIG. 1. Shows the schematic arrangement of the device used to measure the interfacial tension of supramolecular surfactants in a gasoline/water (G/W) system.

The present invention deals with obtaining a supramolecular surfactant with detergent, organic scale dispersant, and corrosion inhibition properties. Said supramolecular surfactant can be used as a detergent, secondary detergent, co-detergent, or auxiliary detergent in liquid hydrocarbons for transporting through ducts or pipelines, storage in metal tanks, and use in internal combustion engines that have metallic or ferrous components. Supramolecular surfactant helps to keep clean the internal combustion engines components such as injectors and intake valves. It also disperses organic scales originating from the precipitation of gums; It also controls, prevents, and reduces the corrosion of metal components where it is in contact since it forms a protective film that prevents the formation of residues on metal surfaces. In liquid hydrocarbon fuels, it helps to make it more efficient combustion, which entails a better calorific value, which has the advantage of improved power, more remarkable performance, lower fuel consumption, and a reduction in polluting emissions.

The formation of the supramolecular surfactant is derived from the non-covalent attractive interactions between a molecule that is a corrosion inhibitor and protects metallic elements and another molecule that has detergency and dispersing properties that allow it to reduce deposits or soiling in intake valves and injectors. The synergy of these properties makes them supramolecular surfactants more efficient to use. It can extend the useful life of metallic components such as pipelines, pipes, storage tanks, and ferrous metallic components of combustion engines.

The supramolecular surfactants of the present invention are the product of self-assembly by non-covalent interactions (such as electrostatic interactions, ion-dipole, dipole-dipole, Van der Waals forces, hydrogen bonds, π-π interactions, and charge transfers) that give rise to what is known as supramolecular surfactants made up of a Component A made up of an oxazolidine derived from polyalkyl/polyalkenyl N-hydroxyalkylsuccinimide, and a Component B made up of a mixture of alkyl/alkenyl-amine-propanoic acids and alkyl/alkenyl-amine dipropanoic acids. The ratio among components A and B is given by the condensed formula A:B, and the molar ratio among them can be from 0.1:10 to 10:0.1, preferably between 1:1 to 4:5. The structural formula of each of the components A and B are detailed below:

Component A is an oxazolidine derived from polyalkyl/polyalkenyl N-hydroxyalkyl succinimides having a structural formula (1) as shown below:

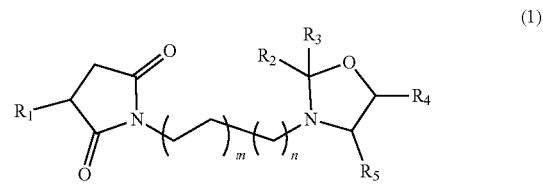

(1)

wherein:
$R_1$ is an alkenyl or polyalkenyl group of average molecular weight in the interval between 400 and 5,000 Da;
m is an integer number between 1 and 5;
n is an integer number between 0 and 1;
$R_2$, $R_3$, $R_4$, and $R_5$ are any of the following independent substituents: —H, —$CH_2(CH_2)_u$V, —$C_6H_3$WX, or —$C_{10}H_4$YZ, wherein
U is an integer number between 0 and 8;
V is any of the substituents —H, —$NH_2$, —OH, y-COOH; and
W, X, Y, and Z are independent substituents of the following groups: linear or branched alkyl chain containing from 1 to 6 carbon atoms, —OH, —$NH_2$, aromatic, methoxy, ethylene oxide, propylene oxide, —COOH, or $SO_3$.

Component B is a mixture of alkyl/alkenyl-amine-propanoic acids and alkyl/alkenyl-amino-dipropanoic acids comprising compounds of structural formula (2a) and (2b) as shown below:

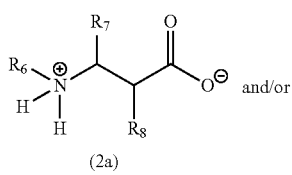

(2a) and/or

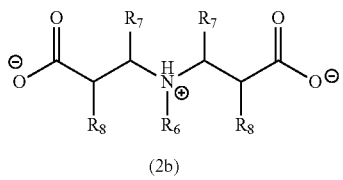

(2b)

wherein: $R_6$ is a linear or branched alkyl or alkenyl chain that contains from 1 to 30 carbon atoms, or a cycloalkyl or aryl group that can contain from 5 to 12 carbon atoms; $R_7$ is the substituent —H; and $R_1$ is the substituent —H or —CH$_3$; and, the compounds of structural formula (2a) and (2b) are in equilibrium with compounds of structural formulas (3a) and (3b), respectively, as shown in Schemes 1 and 2 below:

Scheme 1

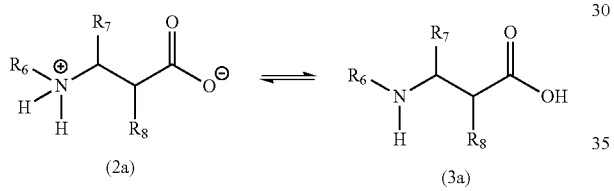

(2a)    (3a)

Scheme 2

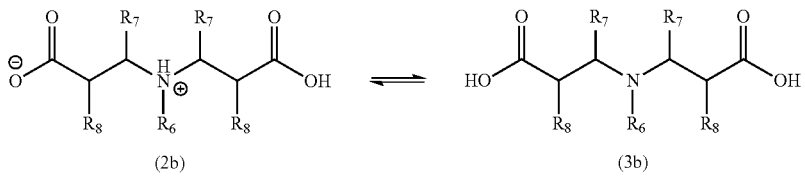

(2b)    (3b)

Self-assembly of the supramolecular surfactants of condensed formula A:B can occur through a single-step synthesis process characterized that consists of: a) mixing the stoichiometric amounts of the components A of structural formula (1) and B of structural formulas (2a, 2b, 3a and 3b) from 0.1:10 mol to 10:0.1 mol, preferably from 1:1 and 4:5 mol; b) by 20 to 240 minutes, preferably by 60 minutes; c) at the temperature from 10 to 100° C., preferably 25° C.; d) at atmospheric pressure; and e) can occur in absence or presence of solvent. If a solvent is employed, this preferably is selected of the following organic solvents: benzene, xylene, xylenes, toluene, light aromatic naphtha, heavy aromatic naphtha, diesel, gasoline, chloroform, aromatic mixtures in a ratio of the solvent to the supramolecular surfactants in an interval between 10 to 80% in weight, preferably from 20-70%. This gives rise to a quantitative process with yields up to 70% inclusive until 100%, wherein no byproducts are formed, and no additional purification is required. This process has the additional advantage of being environmentally friendly and is according to green chemistry parameters. The structures of some exemplary supramolecular surfactants of condensed formula A:B that can be prepared according to this process include the surfactants of structural formulas (4a), (4b), (5a), (5b), (6a), and (6b), as shown below in Scheme 3:

Scheme 3

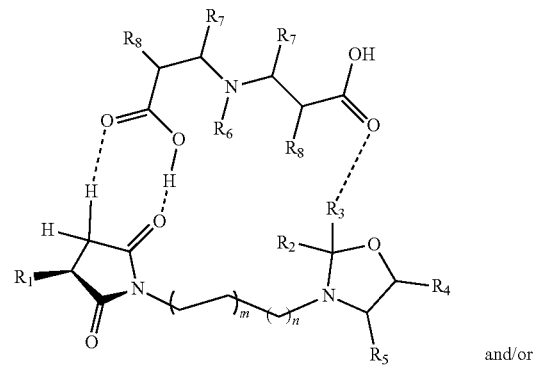

(4a)

and/or

-continued

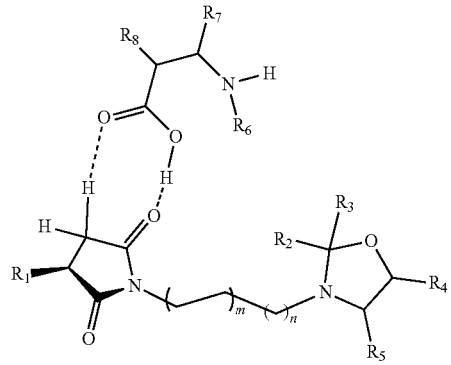

(4b)

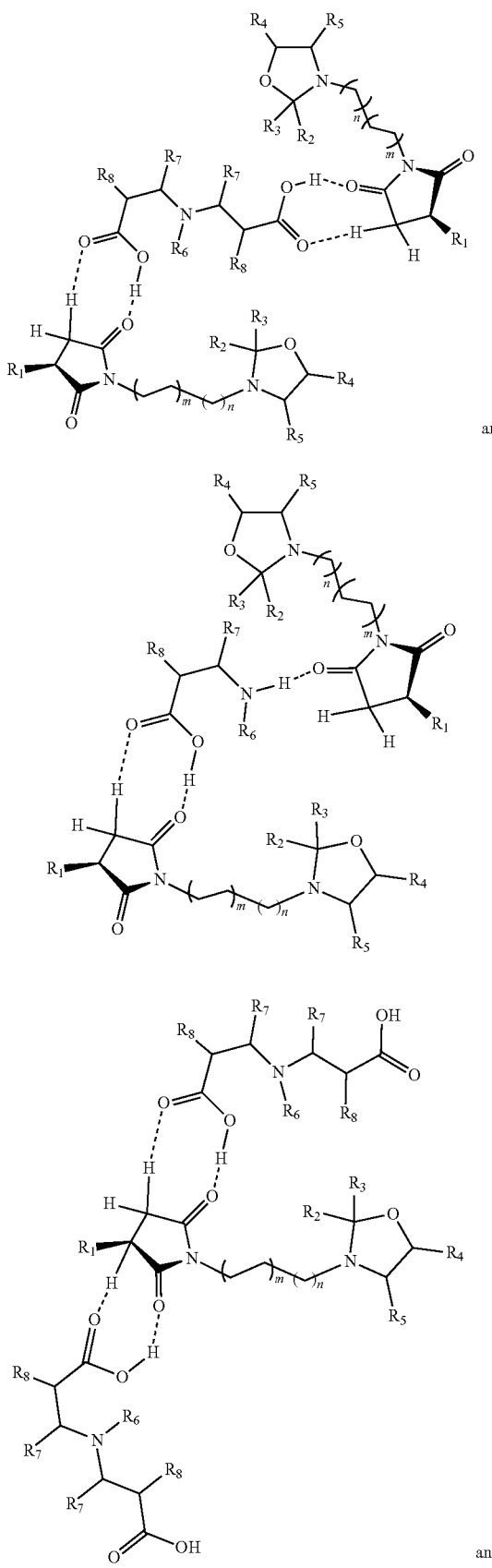

(5a)

and/or (5b)

(6a)

and/or

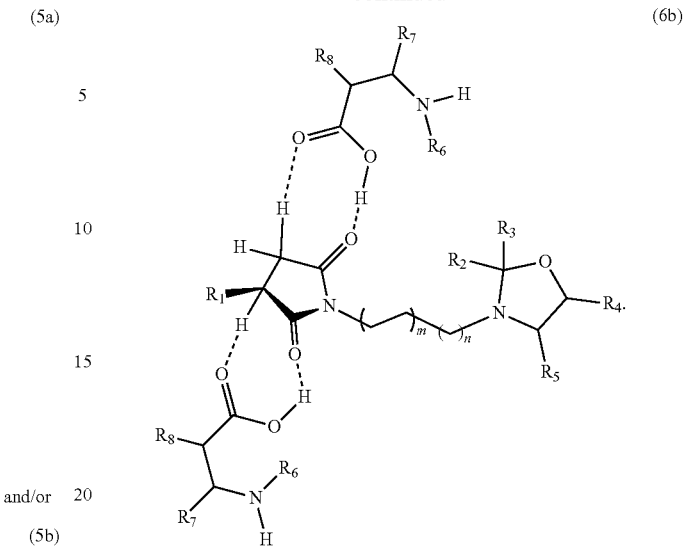

(6b)

The design of the supramolecular surfactants of the present invention took place through computational chemistry, as follow described.

Many challenges related to designing new chemicals with various applications can be approached through computational chemistry. This knowledge area is important to developing and designing molecules with technological applications. Computational chemistry uses quantum theory to predict molecular mechanisms and design chemicals as a solution to a specific problem. This molecular design strategy is worthwhile in several industrial applications, such as the oil industry. To the use of computational chemistry, the characteristics of the problem to be solved must be identified, such as the functionality desired of the final product, the medium composition, the physicochemical properties, as well as the operating conditions of pressure and temperature (A. Sundaram, V. Venkatasubramanianan, J. M. Caruthers, Molecular design of fuel additives, in Computer Aided Molecular Design: Theory and Practice, 2003, 329-352).

Exists organic compounds with carboxylic and phenolic functional groups form complex surfactants with metallic hydroxides, which are bonded through oxygen atoms of one or two carboxylic groups with one or more metallic atoms on the surface. This ability is used to include them in the protector compositions of metals against corrosive environments.

Exists corrosion inhibitors based on alkyl/alkenyl-aminopropanoic acids (β-aminoacids) and alkyl/alkenyl-aminodipropanoic acids (β-imino acids) whose nitrogen atoms have one or two branches of carboxylic acids. The β-aminoacids and β-imino acids trends to form zwitterions through acidic hydrogen transfer from a carboxylic acid to the nitrogen, giving place to an ammonium cation and a carboxylate anion. The hydrogens transfer to the oxygen atoms of the corroded surface promotes the chemisorption of these corrosion inhibitors (U.S. Ser. No. 10/207,983B, R. Cerón-Camacho, R. Cisneros-Dévora, J. M. Martinez-Magadán, et al. J. Molec. Graphics Model. 2019, 93). The corrosion inhibitors based on β-aminoacids and β-imino acids have two tautomers: the neutral form, that have an amino group and the ends of its branches are carboxylic acids, and the zwitterions, which has a quaternary ammonium group and carboxylate group. The corrosion inhibitors with tautomers favor their performance as corrosion inhibitors because, in a hydrophobic environment, the nitrogen atom reaches the corroded surface with a free electron pair, which permits it to interact directly with an iron cation. Both atoms benefit since, in this way, the nitrogen takes on a quaternary form, and the iron maintains its octahedral coordination.

Regarding additives detergents dispersants, exist oxazolidines derived from succinimides polyalky or polyalkenyl of N-hydroxyalkyl (MX269419B), which auditioned in low concentrations to the gasoline reduce drastically the amount of deposits after combustion, obtaining efficiencies until of 91%. His excellent performance is due to the supramolecular complex formation of the molecules of detergent dispersants with gum molecules, avoiding the formation of gum conglomerates. In addition, to clean off deposits from metallic corroded surfaces due to the detergent dispersants are adsorbed strongest regards deposits in these surfaces. The adsorption of the detergent dispersants over metallic surfaces impacts in that having an increment in their concentration to maintain their functionality as detergents dispersants of heavy organic compounds, whereby the development of enhanced products that avoid losses by adsorption is required at the industrial level.

In the present invention, supramolecular surfactants with improved detergent-dispersant and corrosion inhibition properties were developed that allow the protection of metal surfaces against corrosion and prevent the deposition and incrustation of heavy organic components that originate in the gums that are formed from the polymerization of olefinic, nitrogenous and sulfur compounds that are part of the fuels. The molecular mechanism by which the functionality of these supramolecular surfactants is sustained is directed towards the formation of supramolecular complexes between a component A based on oxazolidines derived from polyalkyl or polyalkenyl N-hydroxyalkyl succinimides and a component B based on a mixture of alkyl/alkenyl amino-propanoic-acids and alkyl/alkenyl-amino-dipropanoic acids. Wherein component A, which is more lipophilic than component B, serves as a means of transport for the molecules of Component B so that they can move through the liquid fuel derived from hydrocarbons and can reach the polar layer of metallic oxide of the surface to be protected, where they form a physical barrier that prevents corrosion and prevents heavy organic components from being embedded on it. Once that component B has been released from the supramolecular surfactant, component A is fully available in the liquid fuel to interact with the gums that are dispersed in the medium and in this way, dissolve them to avoid deposition over metallic surfaces, such as intake valves and injectors. This proposal for a molecular mechanism is validated in this document through computational chemistry calculations of the formation energy of supramolecular complexes and the chemisorption of these and their individual components by the oxidized metal surface.

Since under hydrophobic environments that are in contact with small amounts of oxygen and water, Fe (iron) surfaces are covered with stable layers of $\alpha$-$Fe_2O_3$ (hematite), the corroded surface is modeled by a cluster constituted by the coordination complex $Fe(OH)_3(H_2O)_3$, which has a $Fe^{3+}$ cation and an octahedral geometry around it with oxygenated ligands, such as those found in hematite crystal.

The formation of supramolecular surfactants and their chemisorption process on the $Fe(OH)_3(H_2O)_3$ molecular model of the metal surface can be represented as a reaction reactants→products, whose reaction energy ΔE is defined by $$\Delta E = E_{products} - E_{reactants}$$

wherein $E_{reactants}$ and $E_{products}$ are the total energies of the components of the reactants and products, respectively, which in turn are obtained from the sum of the electronic energies $E_r$ and $E_p$ of the individual components of the reactants and products that participate in the reaction, respectively.

$$E_{reactants} = \sum_r E_r$$

$$E_{products} = \sum_p E_p$$

The electronic energies were obtained semi-empirically with the PM3 method. The supramolecular surfactants of the present invention are based on the interaction of oxazolidines derived from polyalkyl or polyalkenyl N-hydroxyalkyl succinimides, particularly for the case of computational chemistry study represented by the model molecule 1-(2-oxazolidine-3-yl-ethyl)-3-(4,4,6,6-tetramethyl-2-methylene-heptyl)-pyrrolidine-2,5-dione, with the mixture of alkyl/alkenyl-amine-propanoic acids and alkyl/alkenyl-amine-dipropanoic acids, particularly for the case of the study of computational chemistry represented by the model molecules of 3-propylamine-propionic acid and 3-[(2-carboxyethyl)-propyl-amine]-propionic acid, which are referred in this invention as 1, 2 and 3, as shown in Scheme 4 below; likewise, the $Fe(OH)_3(H_2O)_3$ complex that simulates hematite is denoted as model 4.

Scheme 4

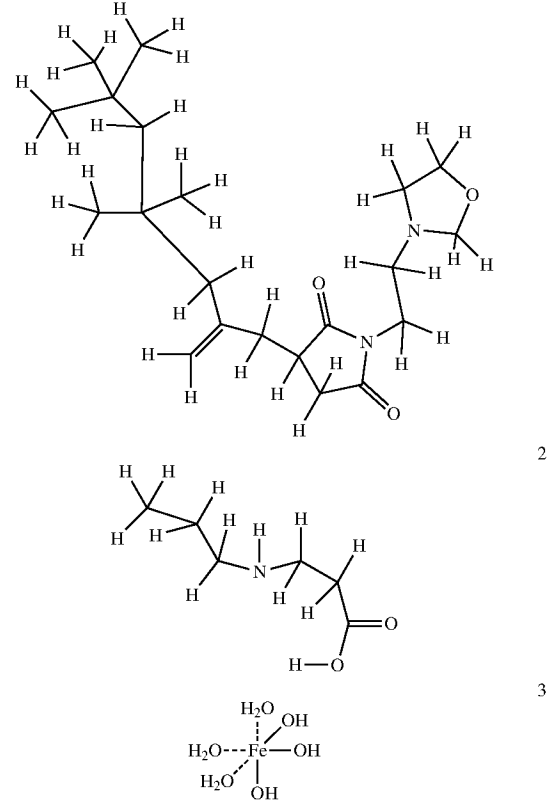

-continued

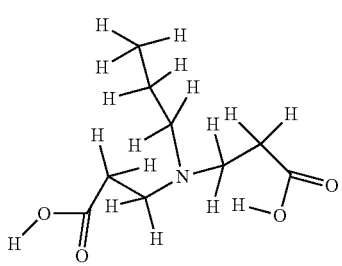

4

EXAMPLES

Below are some examples of the design by computational chemistry, the process for obtaining, and the application of supramolecular surfactants with detergent-dispersant and corrosion-inhibiting properties, wherein it is observed that at concentrations from 5.60 ppm control the formation of deposits in internal combustion machines that use gasoline as fuel, and prevent corrosion in ferrous materials with a B++ rating, and inhibit at least 75% of gum deposits in internal combustion engines. It is understood that said examples are only illustrative and are not intended to limit the scope of the present invention.

Example 1. Chemisorption of 1-(2-oxazolidin-3-yl-ethyl)-3-(4,4,6,6-tetramethyl-2-methylene-heptyl)-pyrrolidine-2,5-dione over the complex $Fe(OH)_3(H_2O)_3$. The negative sign of the reaction energy $\Delta E$ (Table 1) shows that 1-(2-oxazolidine-3-yl-ethyl)-3-(4,4,6,6-tetramethyl-2-methylene-heptyl)-pyrrolidine-2,5-dione 1 is favorably adsorbed by the cluster $Fe(OH)_3(H_2O)_3$ 4. The adsorption occurs through the interaction between an oxygen atom of the succinimide ring of the 1-(2-oxazolidine-3-yl-ethyl)-3-(4,4,6,6-tetramethyl-2-methylene-heptyl)-pyrrolidine-2,5-dione 1 with the iron atom, driving out the water molecule 6 that previously coordinated this iron atom. Therefore, the iron atom of complex 4 prefers to complete its octahedral coordination with 1-(2-oxazolidine-3-yl-ethyl)-3-(4,4,6,6-tetramethyl-2-methylene-heptyl)-pyrrolidine-2,5-dione 1, instead of the water molecule 6, and thus 1-(2-oxazolidine-3-yl-ethyl)-3-(4,4,6,6-tetramethyl-2-methylene-heptyl)-pyrrolidine-2,5-dione 1 has the ability to protect iron metal surfaces against corrosion as shown in Scheme 5 below.

Scheme 5

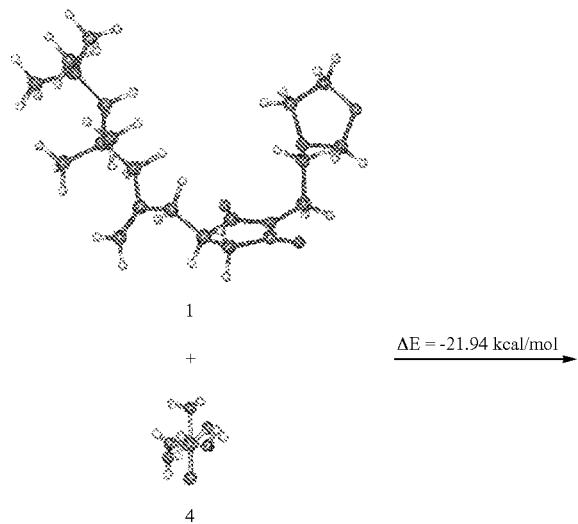

-continued

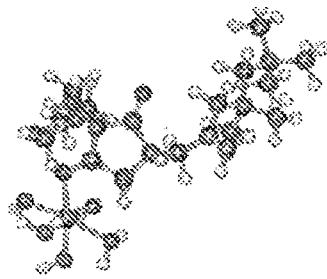

5

+

6

TABLE 1

Formation energy $\Delta E$ of the coordination complex 5 derived from the interaction between 1-(2-oxazolidine-3-yl-ethyl)-3-(4,4,6,6-tetramethyl-2-methylene-heptyl)-pyrrolidine-2,5-dione 1 and the $Fe(OH)_3(H_2O)_3$ complex 4, with the release of a water molecule 6.

| Molecule or complex | Energy (kcal/mol) | Molecule or complex | Energy (kcal/mol) |
|---|---|---|---|
| 1 | −6,022.95 | 4 | −1,491.93 |
| 5 | −7,319.60 | 6 | −217.22 |

| Reaction | Energy reaction $\Delta E$ (kcal/mol) |
|---|---|
| 1 + 4 → 5 + 6 | −21.94 |

Example 2. Chemisorption of 3-propylamine-propionic acid on the $Fe(OH)_3(H_2O)_3$ complex. The negative sign of the reaction energy $\Delta E$ (Table 2) shows that 3-propylamine-propionic acid 2 is favorably adsorbed by the $Fe(OH)_3(H_2O)_3$ complex 4. Adsorption occurs through a chelate formation that has a 6-membered ring 7 (7), in which the oxygen atom of the hydroxyl group of the carboxylic branch and the nitrogen atom of 3-propylamine-propionic acid 2 is bonded to the iron atom forming part of the iron complex 4 (7). The acidic hydrogen of the carboxylic branch of 3-propylamine-propionic acid 2 is transferred to a hydroxyl group of the iron complex 4, thus forming a new water molecule, which is expelled to give rise to the oxygen-iron covalent bond in the new coordination complex 7 (7). The nitrogen of the amino group of 3-propylamine-propionic acid 2, when interacting with the iron atom of complex 4, generates the expulsion of an additional water molecule and forms a coordination bond in the new coordination complex. 7 (7). Two water molecules are expelled in forming the coordination complex 7 because the 3-propylamine-propionic acid 2 generates a chelate when interacting with the coordination complex 4. In contrast to this process, the 1-(2-oxazolidin-3-yl-ethyl)-3-(4,4,6,6-tetramethyl-2-methylene-heptyl)-pyrrolidine-2,5-dione 1 does not form any chelate, but only forms a bond of oxygen-iron coordination in coordination complex 5 of example 1 (6), hence the reaction energy of coordination complex 4 with 3-propylamine-propionic acid 2 (−65.07 kcal/mol [Table 2]) is more intense with respect to that with 1-(2-oxazolidin-3-yl-ethyl)-3-(4,4,6,6-tetramethyl-2-methylene-heptyl)-pyrrolidine-2,5-dione 1 (−21.91 kcal/mol [Table 1]), hence the iron atom of complex 4 prefers to build its octahedral coordination through 3-propylamine- $\Delta E = -21.94 \text{ kcal/mol}$ propionic acid instead of 1-(2-oxazolidine-3-yl-ethyl)-3-(4,4,6,6-tetramethyl-2-methylene-heptyl)-pyrrolidine-2,5-dione 1, and in this way 3-propylamine-propionic acid 2 would interact in preferentially with metallic surfaces generating a more stable protective film than that generated by 1-(2-oxazolidin-3-yl-ethyl)-3-(4,4,6,6-tetramethyl-2-methylene-heptyl)-pyrrolidine-2,5-dione 1 as shown in Scheme 6 below.

Scheme 6

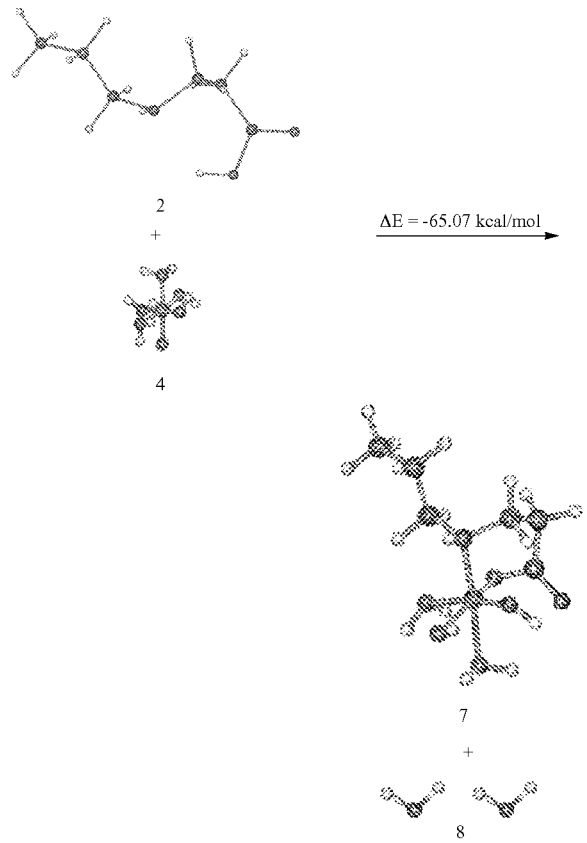

TABLE 2

Formation energy ΔE of the coordination complex 7 derived from the interaction of 3-propylamine-propionic acid 2 and the Fe(OH)₃(H₂O)₃ complex 4, with the release of 2 water molecules (8).

| Molecule or complex | Energy (kcal/mol) | Molecule or complex | Energy (kcal/mol) |
|---|---|---|---|
| 2 | −2,047.39 | 4 | −1,491.93 |
| 7 | −3,169.95 | 8 | −434.44 |

| Reaction | Reaction energy ΔE (kcal/mol) |
|---|---|
| 2 + 4 → 7 + 8 | −65.07 |

Example 3. Chemisorption of 3-[(2-carboxy-ethyl)-propyl-amine]-propionic acid on the Fe(OH)₃(H₂O)₃ complex. The negative sign of the reaction energy ΔE (Table 3) shows that 3-[(2-carboxy-ethyl)-propyl-amine]-propionic acid 3 is favorably adsorbed by the Fe(OH)₃(H₂O)₃ complex 4. The adsorption occurs through the chelate formation of two fused rings with six members each, in which the oxygen atoms of the hydroxyl groups of the carboxylic branches and the nitrogen atom from the 3-[(2-carboxy-ethyl)-propyl-amine]-propionic acid 3 binds to the iron atom of cluster 4 (8) to give rise to the new coordination complex 9 (8). The acidic hydrogens of the carboxylic branches are transferred to two hydroxyl groups of complex 4, thus forming two new water molecules, which are expelled to give rise to the oxygen-iron covalent bonds in the new coordination complex 9 (8). The nitrogen of the amine group of 3-[(2-carboxy-ethyl)-propyl-amine]-propionic acid 3 interacting with the iron atom of cluster 4 generates the expulsion of an additional water molecule and gives rise to the formation of a coordination bond in the new coordination complex 9 (8). Three water molecules are expelled when forming the supramolecular complex 9. Because 3-[(2-carboxy-ethyl)-propyl-amine]-propionic acid 3 forms the chelate of two rings, in contrast to 3-propylamine-propionic acid 2 of example 2, which forms a chelate of a single ring and to 1-(2-oxazolidine-3-yl-ethyl)-3-(4,4,6,6-tetramethyl-2-methylene-heptyl)-pyrrolidine-2,5-dione 1 from example 1, the which does not form any chelate but a single coordination bond is formed. The reaction energy of coordination complex 4 with 3-[(2-carboxy-ethyl)-propyl-amine]-propionic acid 3 (−94.03 kcal/mol [Table 3]) is more intense than that of 3-propylamine-propionic acid 2 (−65.07 kcal/mol [Table 2]) or with 1-(2-oxazolidine-3-yl-ethyl)-3-(4,4,6,6-tetramethyl-2-methylene-heptyl)-pyrrolidine-2,5-dione 1 (−21.91 kcal/mol [Table 1]); hence the iron atom of complex 4 prefers to build its octahedral coordination through the acid 3-[(2-carboxy-ethyl)-propyl-amine]-propionic acid 3 instead of 3-propylamine-propionic acid 2 and 1-(2-oxazolidine-3-yl-ethyl)-3-(4,4,6,6-tetramethyl-2-methylene-heptyl)-pyrrolidine-2,5-dione 1, and thus 3-[(2-carboxy-ethyl)-propyl-amine]-propionic acid 3 can preferentially interact with metallic surfaces generating a more stable protective film than that generated by 3-propylamine-propionic acid 2 and 1-(2-oxazolidine-3-yl-ethyl)-3-(4,4,6,6-tetramethyl-2-methylene-heptyl)-pyrrolidine-2,5-dione 1, as shown in Scheme 7 below.

Scheme 7

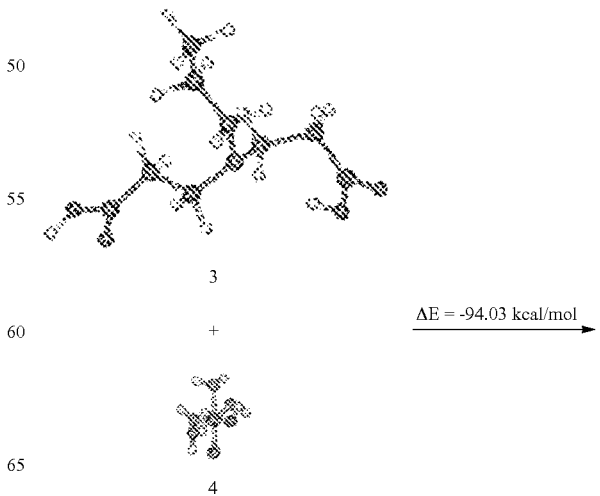

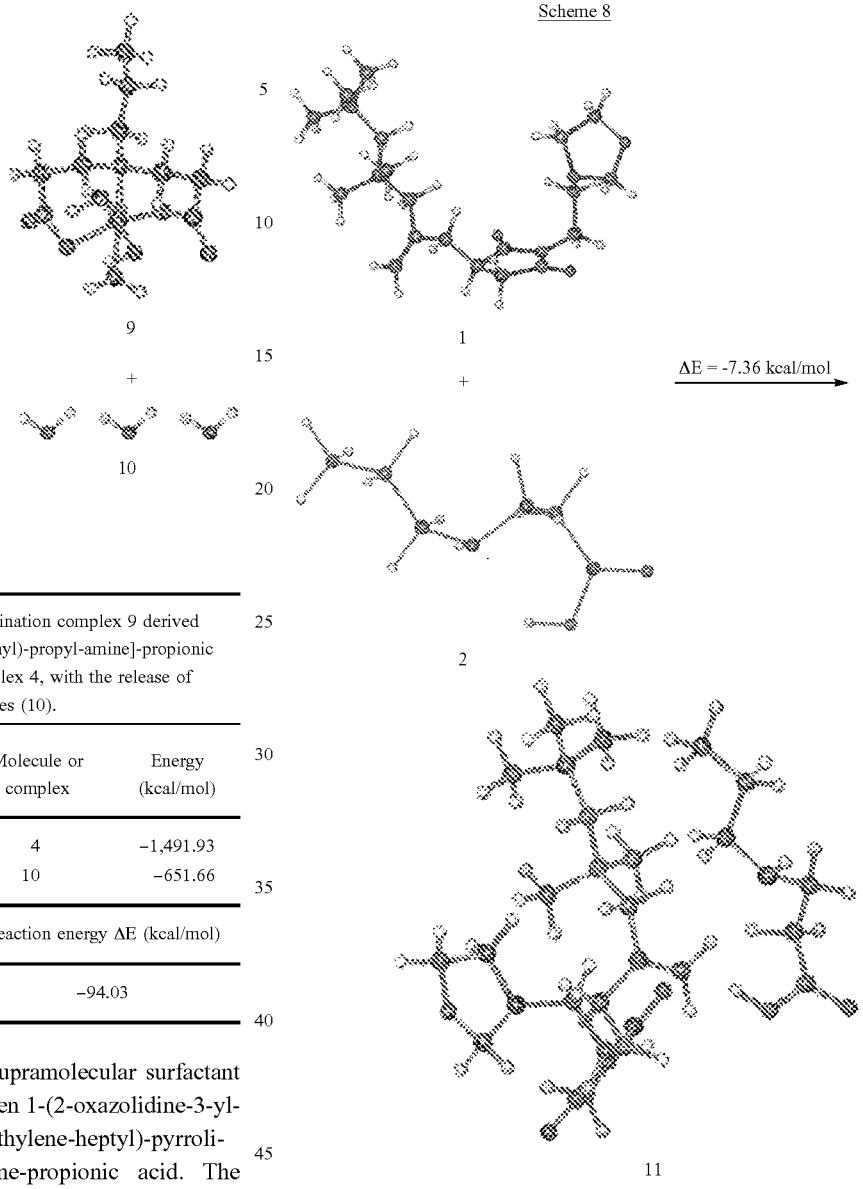

TABLE 3

The formation energy ΔE of the coordination complex 9 derived from the interaction of 3-[(2-carboxy-ethyl)-propyl-amine]-propionic acid 3 and the Fe(OH)$_3$(H$_2$O)$_3$ complex 4, with the release of three water molecules (10).

| Molecule or complex | Energy (kcal/mol) | Molecule or complex | Energy (kcal/mol) |
|---|---|---|---|
| 3 | −2,982.62 | 4 | −1,491.93 |
| 9 | −3,916.92 | 10 | −651.66 |

| Reaction | Reaction energy ΔE (kcal/mol) |
|---|---|
| 3 + 4 → 9 + 10 | −94.03 |

Example 4. Formation of the supramolecular surfactant derived from the interaction between 1-(2-oxazolidine-3-yl-ethyl)-3-(4,4,6,6-tetramethyl-2-methylene-heptyl)-pyrrolidine-2,5-dione and 3-propylamine-propionic acid. The negative sign of the reaction energy ΔE (Table 4) shows that 1-(2-oxazolidine-3-yl-ethyl)-3-(4,4,6,6-tetramethyl-2-methylene-heptyl)-pyrrolidine-2,5-dione 1 favorably forms supramolecular surfactant 11 (supramolecular complex) with 3-propylamine-propionic acid 2 (9). The attractive interaction between them is mediated through a hydrogen bond between the acidic hydrogen of the carboxylic branch of 3-propylamine-propionic acid 2 and oxygen of the succinimide ring of 1-(2-oxazolidine-3-yl-ethyl)-3-(4,4,6,6-tetramethyl-2-methylene-heptyl)-pyrrolidine-2,5-dione 1, and through long-range Van der Waals interactions between the alkyl tails of both chemicals. This fact shows that 1-(2-oxazolidine-3-yl-ethyl)-3-(4,4,6,6-tetramethyl-2-methylene-heptyl)-pyrrolidine-2,5-dione 1 can transport to the 3-propylamine-propionic acid 2 within a hydrophobic medium through the formation of a supramolecular surfactant, as shown in Scheme 8 below.

Example 5. Chemisorption of the supramolecular surfactant derived from the interaction of 1-(2-oxazolidine-3-yl-ethyl)-3-(4,4,6,6-tetramethyl-2-methylene-heptyl)-pyrrolidine-2,5-dione with 3-propylamine-propionic acid over the Fe(OH)$_3$(H$_2$O)$_3$ complex, with the release of 1-(2-oxazolidine-3-yl-ethyl)-3-(4,4,6,6-tetramethyl-2-methylene-heptyl)-pyrrolidine-2,5-dione. The negative sign of the reaction energy ΔE (Table 5) shows that the supramolecular surfactant (supramolecular complex) 11 formed from the interaction of 1-(2-oxazolidine-3-yl-ethyl)-3-(4,4,6,6-tetramethyl-2-methylene-heptyl)-pyrrolidine-2,5-dione 1 and 3-propylamine-propionic acid is adsorbed by the Fe(OH)$_3$(H$_2$O) 4 complex, giving rise to the formation of the coordination complex 7 (10) and liberating in the process to 1-(2-oxazolidine-3-yl-ethyl)-3-(4,4,6,6-tetramethyl-2-methylene-heptyl)-pyrrolidine-2,5-dione 1 and 2 water molecules 8 (10). This fact indicates that 1-(2-oxazolidine-3-yl-ethyl)-3-(4,4,6,6-tetramethyl-2-methylene-heptyl)-pyrrolidine-2,5-dione transports the 3-propylamine-propionic acid 2, which is adsorbed on the Fe(OH)$_3$(H$_2$O) 4 complex, and generates a protective film that controls corrosion problems, which prevents losses by adsorption of 1-(2-oxazolidine-3-yl-ethyl)-3-(4,4,6,6-tetramethyl-2-methylene-heptyl)-pyrrolidine-2,5-dione and it is fully available to act as a detergent dispersant for heavy organic compounds in liquid fuels.

TABLE 4

Formation energy ΔE of the supramolecular surfactant (supramolecular complex) 11 derived from the interaction between (1-(2-oxazolidine-3-yl-ethyl)-3-(4,4,6,6-tetramethyl-2-methylene-heptyl)-pyrrolidine-2,5-dione) 1 and 3-propylamine-propionic acid 2.

| Molecule or complex | Energy (kcal/mol) | Molecule or complex | Energy (kcal/mol) |
|---|---|---|---|
| 1 | −6,022.95 | 11 | −8,077.71 |
| 2 | −2,047.39 | | |
| Reaction | | Reaction energy ΔE (kcal/mol) | |
| 1 + 2 → 11 | | −7.36 | |

TABLE 5

Formation energy ΔE of the formation process of the coordination complex 7, obtained from the interaction of the supramolecular surfactant 11 with the complex (Fe(OH)$_3$(H$_2$O)$_3$) 4, with the release of 1 molecule of 1-(2-oxazolidine-3-yl-ethyl)-3-(4,4,6,6-tetramethyl-2-methylene-heptyl)-pyrrolidine-2,5-dione 1 and 2 water molecules 8, as shown in Scheme 9 below.

| Molecule or complex | Energy (kcal/mol) | Molecule or complex | Energy (kcal/mol) |
|---|---|---|---|
| 4 | −1,491.93 | 11 | −8,077.71 |
| 1 | −6,022.95 | 7 | −3,169.95 |
| 8 | −434.44 | | |
| Reaction | | Reaction energy ΔE (kcal/mol) | |
| 4 + 11 → 1 + 7 + 8 | | −57.70 | |

Scheme 9

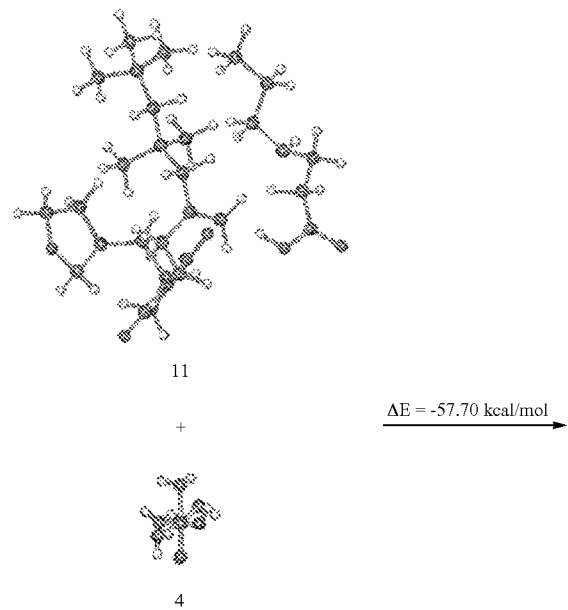

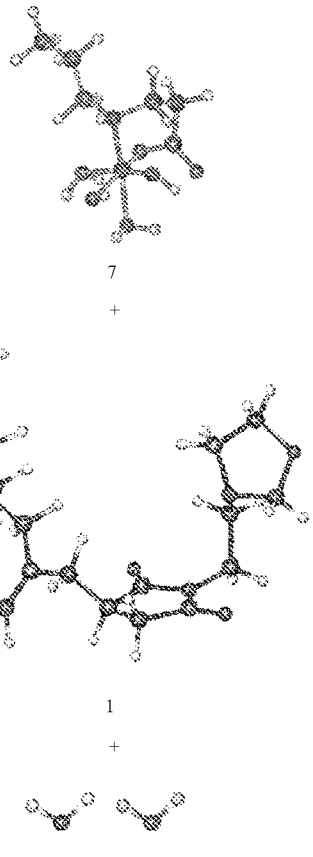

Formation of the Supramolecular Surfactant Derived from the Interaction Among 1-(2-oxazolidine-3-yl-ethyl)-3-(4,4,6,6-tetramethyl-2-methylene-heptyl)-pyrrolidine-2,5-dione and 3-propylamine-propionic acid Example 6. Formation of the supramolecular surfactant derived from the interaction between 1-(2-oxazolidine-3-yl-ethyl)-3-(4,4,6,6-tetramethyl-2-methylene-heptyl)-pyrrolidine-2,5-dione and 3-[(2-carboxy-ethyl)-propyl-amine]-propionic acid. The negative sign of the reaction energy ΔE (Table 6) shows that 1-(2-oxazolidine-3-yl-ethyl)-3-(4,4,6,6-tetramethyl-2-methylene-heptyl)-pyrrolidine-2,5-dione 1 forms the supramolecular surfactant (supramolecular complex) 12 with 3-[(2-carboxy-ethyl)-propyl-amine]-propionic acid 3 (11). The attractive interaction is mediated through a hydrogen bond between the acidic hydrogen of a carboxylic branch of 3-[(2-carboxy-ethyl)-propyl-amine]-propionic acid 3 and oxygen of the succinimide ring of the 1-(2-oxazolidine-3-yl-ethyl)-3-(4,4,6,6-tetramethyl-2-methylene-heptyl)-pyrrolidine-2,5-dione 1, and through long-range Van der Waals interaction between the alkyl tails of both chemicals. This fact shows that 1-(2-oxazolidine-3-yl-ethyl)-3-(4,4,6,6-tetramethyl-2-methylene-heptyl)-pyrrolidine-2,5-dione 1 can carry to 3-[(2-carboxy-ethyl)-propyl-amine]-propionic acid 3 within a hydrophobic medium. Compared with 3-propylamine-propionic acid 2, it is more feasible for 3-[(2-carboxy-ethyl)-propyl-amine]-propionic acid 3 to be carried in the hydrophobic medium by 1-(2-oxazolidine-3-yl-ethyl)-3-(4,4,6,6-tetramethyl-2-methylene-heptyl)-pyrrolidine-2,5-dione 1 since the formation energy of the supramolecular complex between the last two is more intense (−8.28 kcal/mol, Table 6) than between 1-(2-oxazolidine-3-yl-ethyl)-3-(4,4,6,6-tetramethyl-2-methylene-heptyl)-pyrrolidine-2,5-dione 1 and 3-propylamine-propionic acid 2 (−7.36 kcal/mol, Table 4), as shown in Scheme 10 below.

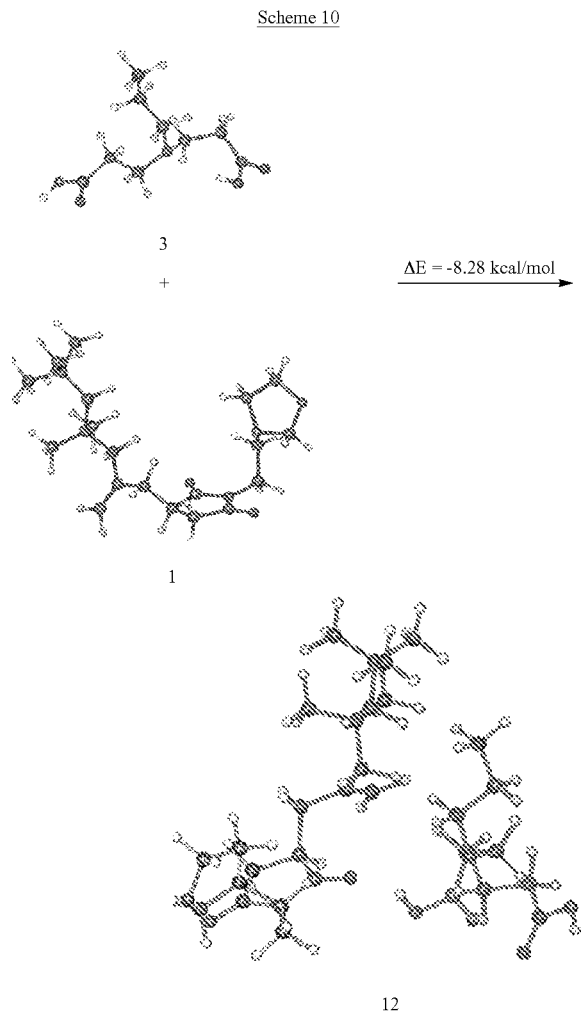

Scheme 10

$\Delta E = -8.28$ kcal/mol

TABLE 6

Formation energy $\Delta E$ of the supramolecular surfactant (supramolecular complex) 12 derived from the interaction between 1-(2-oxazolidine-3-yl-ethyl)-3-(4,4,6,6-tetramethyl-2-methylene-heptyl)-pyrrolidine-2,5-dione 1 and 3-[(2-carboxy-ethyl)-propyl-amine]-propionic acid 3.

| Molecule or complex | Energy (kcal/mol) | Molecule or complex | Energy (kcal/mol) |
|---|---|---|---|
| 1 | −6,022.95 | 3 | −2,982.62 |
| 12 | −9,013.85 | | |

| Reaction | Reaction energy $\Delta E$ (kcal/mol) |
|---|---|
| 1 + 3 → 12 | −8.28 |

Example 7. Chemisorption of the supramolecular surfactant derived from the interaction of 1-(2-oxazolidine-3-yl-ethyl)-3-(4,4,6,6-tetramethyl-2-methylene-heptyl)-pyrrolidine-2,5-dione with 3-[(2-carboxy-ethyl)-propyl-amine]-propionic acid over the $Fe(OH)_3(H_2O)_3$ complex, with the release of 1-(2-oxazolidine-3-yl-ethyl)-3-(4,4,6,6-tetramethyl-2-methylene-heptyl)-pyrrolidine-2,5-dione. The negative sign of the reaction energy $\Delta E$ (Table 7) shows that supramolecular surfactant (supramolecular complex) 12 formed from the interaction of 1-(2-oxazolidine-3-yl-ethyl)-3-(4,4,6,6-tetramethyl-2-methylene-heptyl)-pyrrolidine-2,5-dione and 3-[(2-carboxy-ethyl)-propyl-amine]-propionic acid 3 is adsorbed by the $Fe(OH)_3(H_2O)_3$ complex 4, giving rise to the formation of the coordination complex 9 (12) and in the process releasing 1-(2-oxazolidine-3-yl-ethyl)-3-(4,4,6,6-tetramethyl-2-methylene-heptyl)-pyrrolidine-2,5-dione 1 and 3 molecules of water 10 (12). This fact indicates that the detergent dispersant 1 base 1-(2-oxazolidine-3-yl-ethyl)-3-(4,4,6,6-tetramethyl-2-methylene-heptyl)-pyrrolidine-2,5-dione transports 3-[(2-carboxy-ethyl)-propyl-amine]-propionic acid 3, which is adsorbed on the $Fe(OH)_3(H_2O)_3$ complex 4, and generates a protective film that controls corrosion problems, which allows no adsorption losses of 1-(2-oxazolidine-3-yl-ethyl)-3-(4,4,6,6-tetramethyl-2-methylene-heptyl)-pyrrolidine-2,5-dione. Furthermore, have it is fully available to act as a detergent dispersant for heavy organic compounds in liquid fuels.

TABLE 7

Formation energy $\Delta E$ of the formation process of the coordination complex 9, obtained from the interaction of the supramolecular surfactant 12 with the complex $(Fe(OH)_3(H_2O)_3)$ 4, with the release of 1 molecule of 1-(2-oxazolidine-3-yl-ethyl)-3-(4,4,6,6-tetramethyl-2-methylene-heptyl)-pyrrolidine-2,5-dione 1 and 3 water molecules 10, as shown in Scheme 11 below.

| Molecule or complex | Energy (kcal/mol) | Molecule or complex | Energy (kcal/mol) |
|---|---|---|---|
| 4 | −1,491.93 | 12 | −9,013.85 |
| 1 | −6,022.95 | 9 | −3,916.92 |
| 10 | −651.66 | | |

| Reaction | Reaction energy $\Delta E$ (kcal/mol) |
|---|---|
| 4 + 12 → 1 + 9 + 10 | −85.75 |

Scheme 11

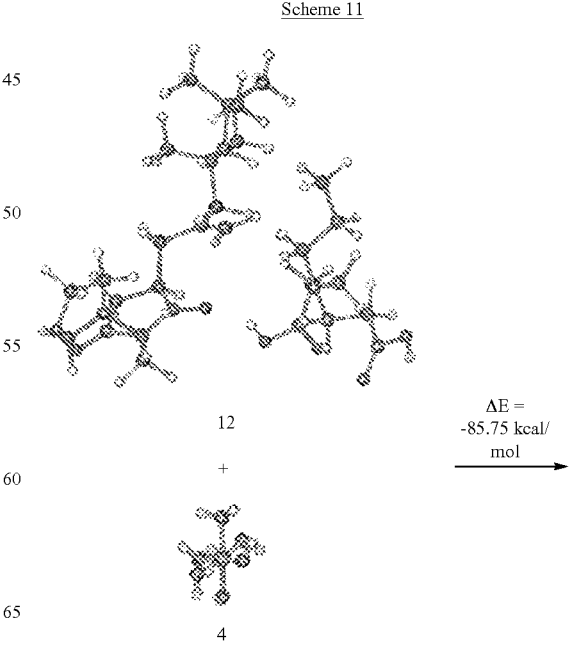

$\Delta E = -85.75$ kcal/mol

-continued

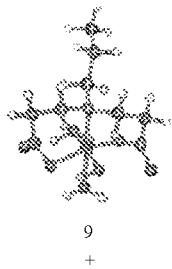

9
+

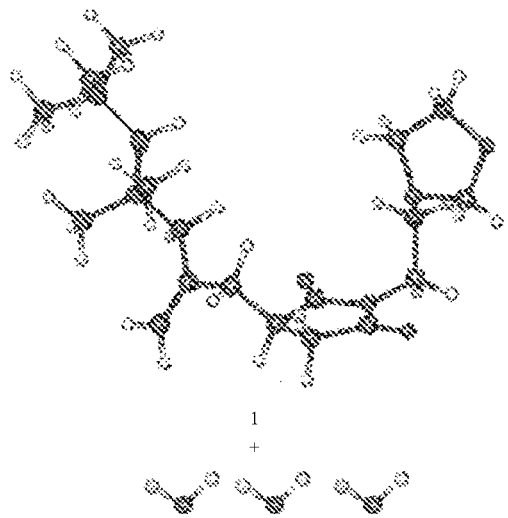

1
+

10

Example 8. Formation of the supramolecular surfactant derived from the interaction between two molecules of 1-(2-oxazolidine-3-yl-ethyl)-3-(4,4,6,6-tetramethyl-2-methylene-heptyl)-pyrrolidine-2,5-dione and a molecule of 3-[(2-carboxy-ethyl)-propyl-amine]-propionic acid. The negative sign of the reaction energy ΔE (Table 8) shows that two molecules of 1-(2-oxazolidine-3-yl-ethyl)-3-(4,4,6,6-tetramethyl-2-methylene-heptyl)-pyrrolidine-2,5-dione 13 form the supramolecular surfactant (supramolecular complex) 14 by interacting with a 3-[(2-carboxy-ethyl)-propyl-amine]-propionic acid molecule 3 (13). The attractive interaction is mediated through hydrogen bonds between the acidic hydrogens of the two carboxylic branches of 3-[(2-carboxy-ethyl)-propyl-amine]-propionic acid 3 and oxygen atoms of the succinimide rings of the two molecules of 1-(2-oxazolidine-3-yl-ethyl)-3-(4,4,6,6-tetramethyl-2-methylene-heptyl)-pyrrolidine-2,5-dione 13, as well as of the long-range Van der Waals interaction between the tails of the components that form the supramolecular surfactant 14. Since the carboxylic branches extend in opposite directions in the 3-[(2-carboxy-ethyl)-propyl-amine]-propionic acid 3, the two molecules of 1-(2-oxazolidine-3-yl-ethyl)-3-(4,4,6,6-tetramethyl-2-methylene-heptyl)-pyrrolidine-2,5-dione 13 encapsulates to 3-[(2-carboxy-ethyl)-propyl-amine]-propionic acid 3. This fact shows that two molecules of 1-(2-oxazolidine-3-yl-ethyl)-3-(4,4,6,6-tetramethyl-2-methyl-ene-heptyl)-pyrrolidine-2,5-dione 13 can carry to 3-[(2-carboxy-ethyl)-propyl-amine]-propionic acid 3 within a hydrophobic medium, as shown in Scheme 12 below.

TABLE 8

Formation energy ΔE of the supramolecular complex 14 derived from the interaction of 2 molecules of 1-(2-oxazolidine-3-yl-ethyl)-3-(4,4,6,6-tetramethyl-2-methylene-heptyl)-pyrrolidine-2,5-dione with 1 molecule of 3-[(2-carboxy-ethyl)-propyl-amine]-propionic acid.

| Molecule or complex | Energy (kcal/mol) | Molecule or complex | Energy (kcal/mol) |
|---|---|---|---|
| 3 | −2,982.62 | 13 | −12,045.90 |
| 14 | −15,041.37 | | |

| Reaction | Reaction Energy ΔE (kcal/mol) |
|---|---|
| 3 + 13 → 14 | −12.85 |

Scheme 12

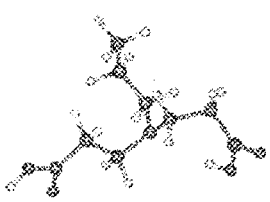

3
+

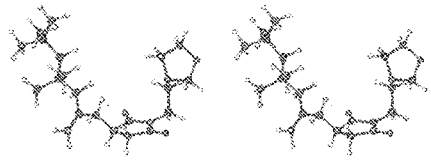

13

ΔE = -12.85 kcal/mol
⟶

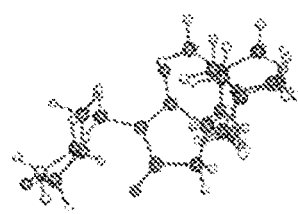

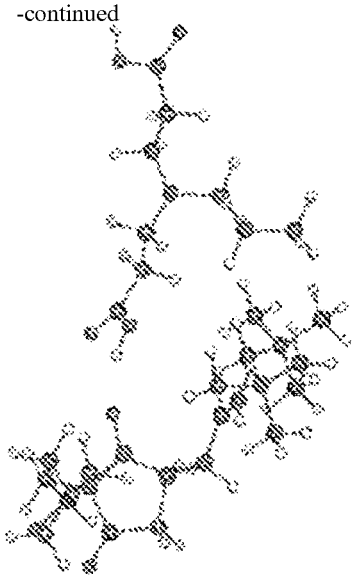

14

Examples 1 to 8 demonstrate theoretically, through computational chemistry applied to the study of supramolecular interactions, that the mixture of oxazolidines derived from polyalkyl/polyalkenyl N-hydroxyalkylsuccinimide with alkyl/alkenyl-amine-propanoic acids and/or alkyl/alkenyl-amine acid leads to the formation of supramolecular surfactants, which when in contact with metal surfaces disassemble and generate a protective film against corrosion based on alkyl/alkenyl-amine-propanoic acids and/or alkyl/alkenyl-amine acids and release within the hydrophilic medium to oxazolidines derived from polyalkyl/polyalkenyl N-hydroxyalkylsuccinimide. This fact has an impact in that there are no adsorption losses of the oxazolidines derived from polyalkyl/polyalkenyl N-hydroxyalkylsuccinimide and; therefore, the supramolecular surfactants of the present invention are novel and have improved properties as dispersant detergents and corrosion inhibitors that can be applied in liquid hydrocarbons.

Example 9. Preparation of supramolecular surfactant SS-1 (1:1 ratio) in the absence of solvent. In a 100 ml round-bottom flask equipped with a magnetic stirrer, heating mantle, and thermometer, containing 6.97 g of an oxazolidine derived from polyalkenyl N-hydroxyalkylsuccinimide with an average molecular weight of 1,116 Da whose general structure is shown in (1), where m is equal to 1, n is equal to 0, $R_2$, $R_3$, $R_4$ and $R_5$ are —H groups, 2.55 g of a mixture containing a 70/30 ratio of oleyl-amine-propanoic/oleyl-amine-dipropanoic acid were added. The mixture was stirred for 60 minutes at room temperature (25° C.) and atmospheric pressure; At the end of the reaction time, 9.52 g of supramolecular surfactant SS-1 was obtained as a viscous orange liquid.

The spectroscopic characteristics of supramolecular surfactant SS-1 are as follows: FT-IR characterization: (cm$^{-1}$) 3,456; 2,951; 2,925; 2,875; 2,731; 1,773; 1,708; 1,636; 1,608; 1,506; 1,465; 1,389; 1,366; 1,230; 1,155; 1,060; 1,022; 951; 923; 879; 805.

In the FT-IR spectrum of the supramolecular surfactant SS-1, the symmetric and asymmetric tension bands of the succinimide group appear at 1,773 and 1,708 cm$^{-1}$, respectively; and the carbonyl groups band corresponding to oleyl-amine propanoic/dipropanoic acids overlaps with the asymmetric tension band of the succinimide group and appears at 1,708 cm$^{-1}$. In the infrared spectrum of the mixture of oleyl-amine propanoic/dipropanoic acids used as raw material for synthesizing the supramolecular surfactant SS-1, the band of carbonyl groups appears at 1,717 cm$^{-1}$. A comparison of the wavenumbers found in both infrared spectra leads to the fact that this carbonyl group in the spectrum of the supramolecular surfactant SS-1 is shifted 9 cm$^{-1}$ to lower frequencies concerning the wavenumber found in the spectrum of oleyl-amine propanoic/dipropanoic acids used as raw materials.

On the other hand, the symmetric and asymmetric tension bands of the succinimide group in the infrared spectrum of the oxazolidine derived from polyalkenyl N-hydroxyalkylsuccinimide with an average molecular weight of 1,116 Da that was used as raw material for the synthesis of the supramolecular surfactant SS-1, they appear at 1,775 and 1,706 cm$^{-1}$, respectively. The comparison of the wavenumbers of said bands of the succinimide group with the spectrum of the supramolecular surfactant SS-1 indicates that there is a shift of 2 cm$^{-1}$ between each of these bands. The variations observed in the wavenumbers associated with the vibration frequencies in the succinimide and carbonyl groups in the supramolecular surfactant concerning those obtained in the oxazolidine derived from polyalkenyl N-hydroxyalkylsuccinimide and in the mixture of oleyl-amine propanoic/dipropanoics acids that are used as raw materials, unequivocally demonstrate the formation of the supramolecular surfactant SS-1.

It should be noted that displacements of this type in the wavenumber associated with the vibration frequencies of functional groups have been reported in the literature as experimental evidence to demonstrate the existence of supramolecular assemblies. (J. Donon, S. Habka, T. Very, F. Charnay-Pouget, M. Mons, D. J. Aitken, V. Brenner, E. Gloaguen. Chem. Phys. Chem. 2021, 22, 2442; S. Habka, T. Very, J. Donon, V. Vaquero-Vara, B. Tardivel, F. Charnay-Pouget, M. Mons, D. J. Aitken, V. Brenner. E. Gloaguen. Phys. Chem. Chem. Phys. 2019, 21, 12798; C. Chi, X. Li, Y. Zhang, L. Li, Z. Wang. Food Funct. 2017, 8, 720; M. Shirakawa, S. I. Kawano, N. Fujita, K. Sada, S. Shinkai. J. Org. Chem. 2003, 68, 5037; MX338862B).

Figure 4:
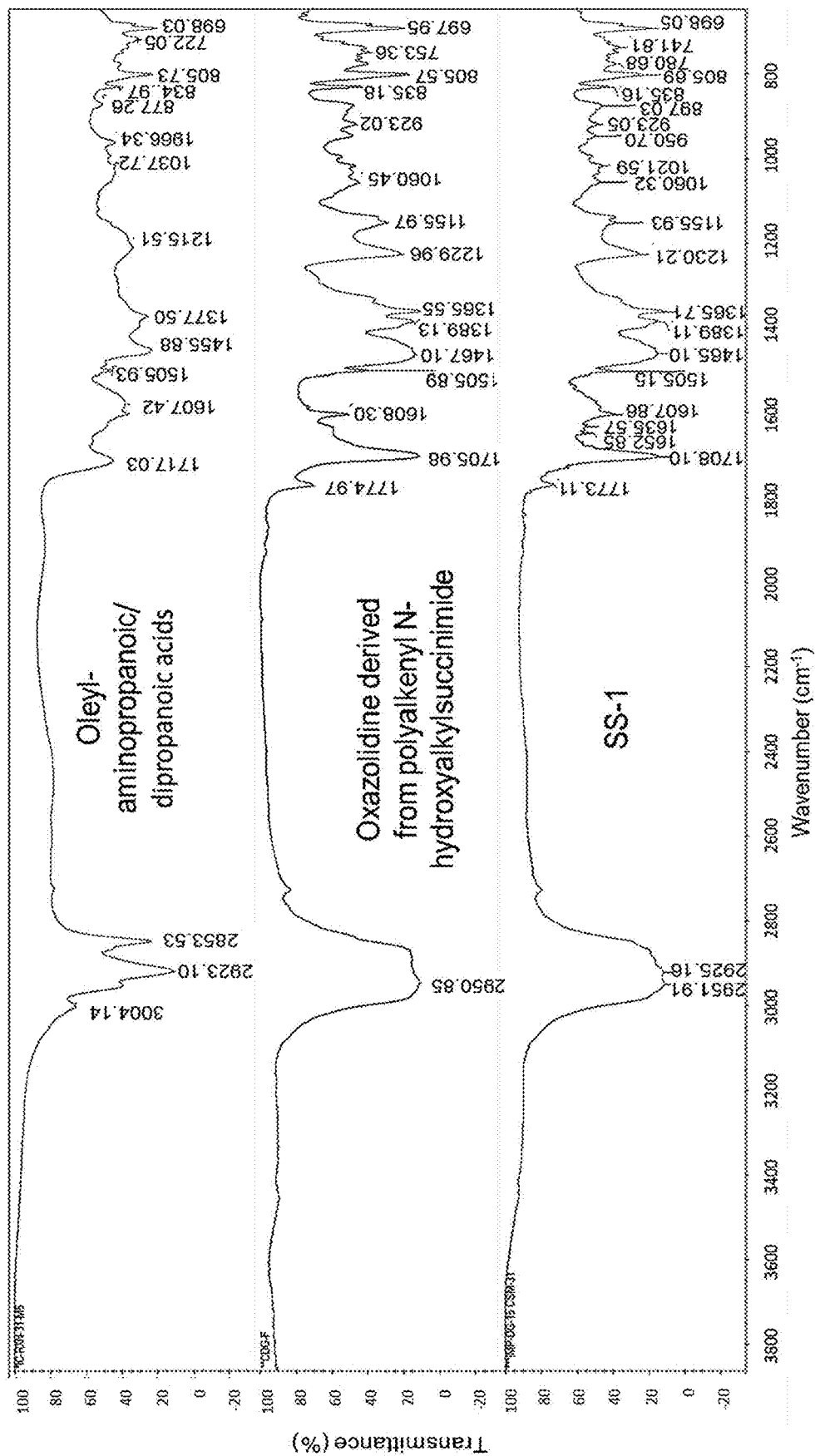
FIG. 4. Illustrates the comparative FT-IR spectra of the supramolecular surfactant, SS-1 prepared without solvents, and their respective raw materials.

The comparative FT-IR spectra of the supramolecular surfactant SS-1 with its raw materials are shown in FIG. 4.

Characterization by Nuclear Magnetic Resonance of Hydrogen-1 ($^1$H NMR): (CDCl$_3$), 600 MHz, δ (ppm): 5.21; 4.86; 4.25; 3.60; 3.25; 2.20; 1.70; 1.12 y 0.99.

Characterization by Nuclear Magnetic Resonance of Carbon-13 ($^{13}$C NMR): (CDCl$_3$), 50 MHz, δ (ppm): 179.73; 176.52; 175.93; 174.93; 86.77; 63.17; 59.32; 58.76; 58.15; 57.12; 52.11; 51.00; 50.23; 38.14; 32.43 y 15.65.

In the $^{13}$C NMR spectrum of the supramolecular surfactant SS-1, are observed the chemical shifts corresponding to the carbonyl groups of the succinimide group at 179.73 and 176.52 ppm and the corresponding to the carbonyl group of the oleyl-amine propanoic/dipropanoic acids appear at 175.93 and 174.93 ppm. When we make the comparison with the spectra of the raw materials, it is found that in the $^{13}$C NMR spectrum of the oxazolidine derived from polyalkenyl N-hydroxyalkylsuccinimide with an average molecular weight of 1,116 Da, the signals of the carbonyl groups of the succinimide group appear at 179.80 and 176.60 ppm, which implies a high-field shift of these carbonyl groups concerning the shifts obtained in the $^{13}$C NMR spectrum of the supramolecular surfactant SS-1. Likewise, in the $^{13}$C NMR spectrum of oleyl-amine propanoic/dipropanoic acids, it is observed that the signals of the carbonyl group appear at 175.58 and 174.81 ppm, which entails a displacement to low fields of these carbonyl groups concerning the shifts obtained, in the $^{13}$C NMR spectrum of the supramolecular surfactant SS-1 (FIG. 4).

The variations observed in the chemical shifts of the carbonyl groups in the supramolecular surfactant concerning those obtained in the oxazolidine derived from polyalkenyl N-hydroxyalkylsuccinimide and in the mixture of oleyl-amine propanoic/dipropanoic acids that are used as raw materials, unequivocally demonstrate the formation of the supramolecular surfactant SS-1 and agree with what was found through FT-IR spectroscopy. It should be noted that chemical shifts of this type have been reported in the literature as experimental evidence to demonstrate that supramolecular assemblies exist. (A. Pastor, E. Martinez-Viviente. Coord. Chem. Rev. 2008, 252, 2314; P. S. Denkova, L. Van Lokeren, I. Verbruggen, R. Willem. J. Phys. Chem. B 2008, 112, 10935; M. Pons, P. Bernardó. Supramolecular Chemistry in Encyclopedia of Nuclear Magnetic Resonance, John Wiley & Sons. Ltd. Chichester, 2002, MX338862B).

Figure 5:
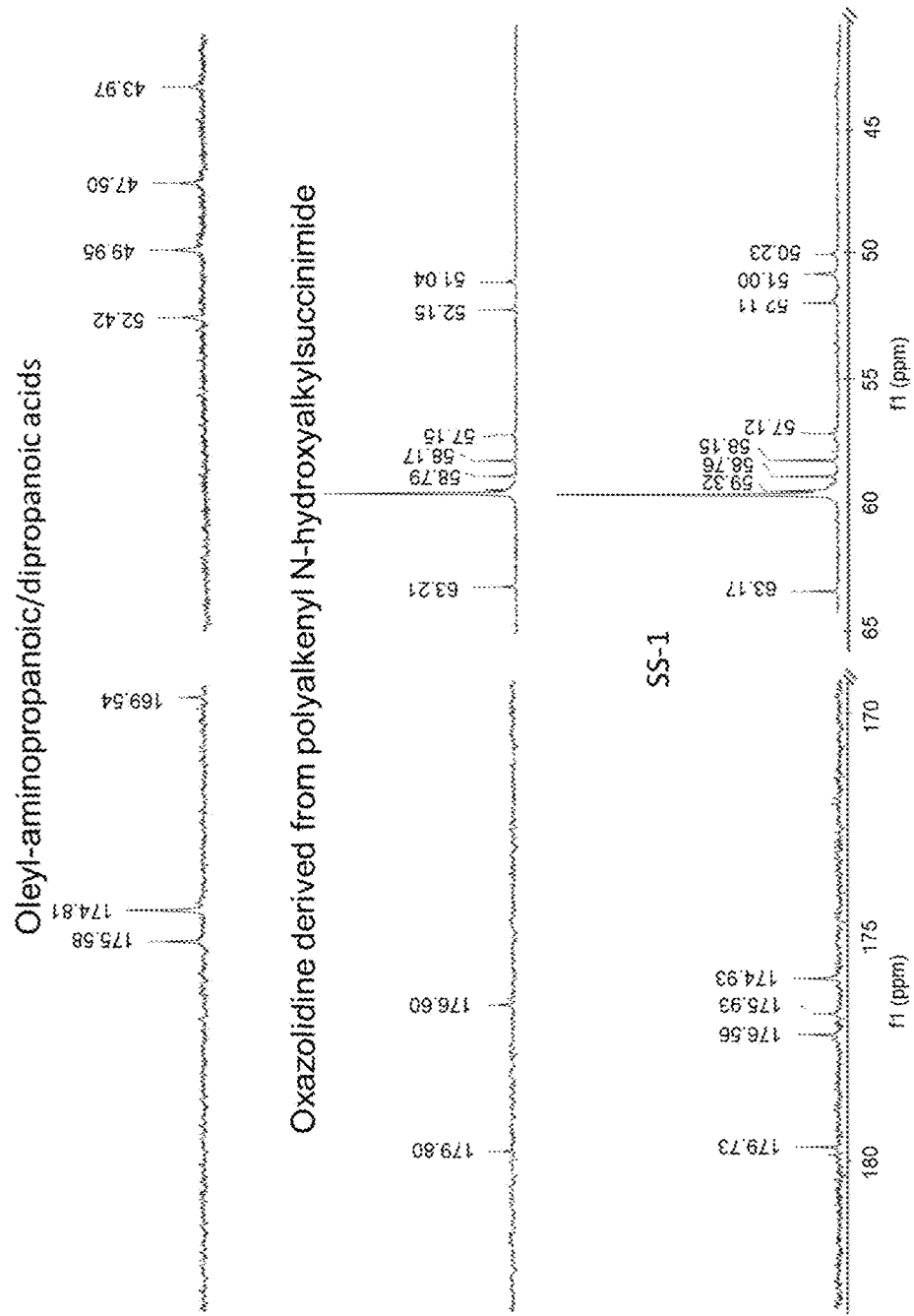
FIG. 5. Shows a representative comparison of the $^{13}C$ NMR spectra of SS-1 and their raw materials.

A representative comparison of the $^{13}$C NMR spectra of SS-1 and its raw materials is shown in FIG. 5.

Example 10. Preparation of supramolecular surfactant SS-1 (1:1 ratio) in the presence of a solvent. In a reactor at atmospheric pressure, at 40° C., 14.7 kg of a solution of oxazolidine derived from polyalkenyl N-hydroxyalkylsuccinimide with an average molecular weight of 1,116 Da is added, whose general structure is shown in (1), where m is equal to 1, n is equal to 0, $R_2$, $R_3$, $R_4$ and $R_5$ are —H groups, dissolved in light aromine at 55% of active. Subsequently, 3.7 kg of a solution of alkyl/alkenyl-amino-propanoic and alkyl/alkenyl-amino-dipropanoic acids dissolved in light aromine at 40% active is added in a controlled manner. Stirring at 225 rpm is maintained until complete dissolution and homogenization for 60 minutes, after which the supramolecular surfactant has formed.

FT-IR characterization: (cm$^{-1}$) 2,951; 2,924; 1,773; 1,706; 1,636; 1,608; 1,506; 1,466; 1,389; 1,366; 1,230; 1,156; 1,060; 1,021; 923; 879; 806; 698.

In the FT-IR spectrum of the supramolecular surfactant SS-1, the symmetric and asymmetric tension bands of the succinimide group appear at 1,773 and 1,705 cm$^{-1}$, respectively; and the band of carbonyl groups corresponding to oleyl-amine propanocos/dipropanocos acids overlaps with the asymmetric tension band of the succinimide group and appears at 1,705 cm$^{-1}$ (FIG. 5). In the infrared spectrum of the mixture of oleyl-amine propanoic/dipropanoic acids used as raw material for synthesizing supramolecular surfactant SS-1, the band of carbonyl groups appears at 1,719 cm$^{-1}$. A comparison of the wavenumbers found in both infrared spectra leads to the fact that this carbonyl group in the spectrum of the supramolecular surfactant SS-1 shift 14 cm$^{-1}$ to lower frequencies concerning the wavenumber found in the spectrum of oleyl-amine propanoic/dipropanoic acids used as raw material.

On the other hand, the symmetric and asymmetric tension bands of the succinimide group in the infrared spectrum of the oxazolidine derived from polyalkenyl N-hydroxyalkylsuccinimide with an average molecular weight of 1,116 Da that was used as raw material for the synthesis of the supramolecular surfactant SS-1 they appear at 1,775 and 1,706 cm$^{-1}$, respectively. The comparison of the wavenumbers of said bands of the succinimide group with the spectrum of the supramolecular surfactant SS-1 indicates that there is a displacement of 2 cm$^{-1}$ between each of these bands. The variations observed in the wavenumbers associated with the vibration frequencies in the succinimide and carbonyl groups in the supramolecular surfactant concerning those obtained in the oxazolidine derived from polyalkenyl N-hydroxyalkylsuccinimide and in the mixture of oleyl-amine propanoic/dipropanoics acids that are used as raw materials, unequivocally demonstrate the formation of the supramolecular surfactant SS-1.

It should be noted that displacements of this type in the wavenumber associated with the vibration frequencies of functional groups have been reported in the literature as experimental evidence to demonstrate the existence of supramolecular assemblies. (J. Donon, S. Habka, T. Very, F. Charnay-Pouget, M. Mons, D. J. Aitken, V. Brenner, E. Gloaguen. Chem. Phys. Chem. 2021, 22, 2442; S. Habka, T. Very, J. Donon, V. Vaquero-Vara, B. Tardivel, F. Charnay-Pouget, M. Mons, D. J. Aitken, V. Brenner. E. Gloaguen. Phys. Chem. Chem. Phys. 2019, 21, 12798; C. Chi, X. Li, Y. Zhang, L. Li, Z. Wang. Food Funct. 2017, 8, 720; M. Shirakawa, S. I. Kawano, N. Fujita, K. Sada, S. Shinkai. J. Org. Chem. 2003, 68, 5037; MX338862B).

Figure 6:
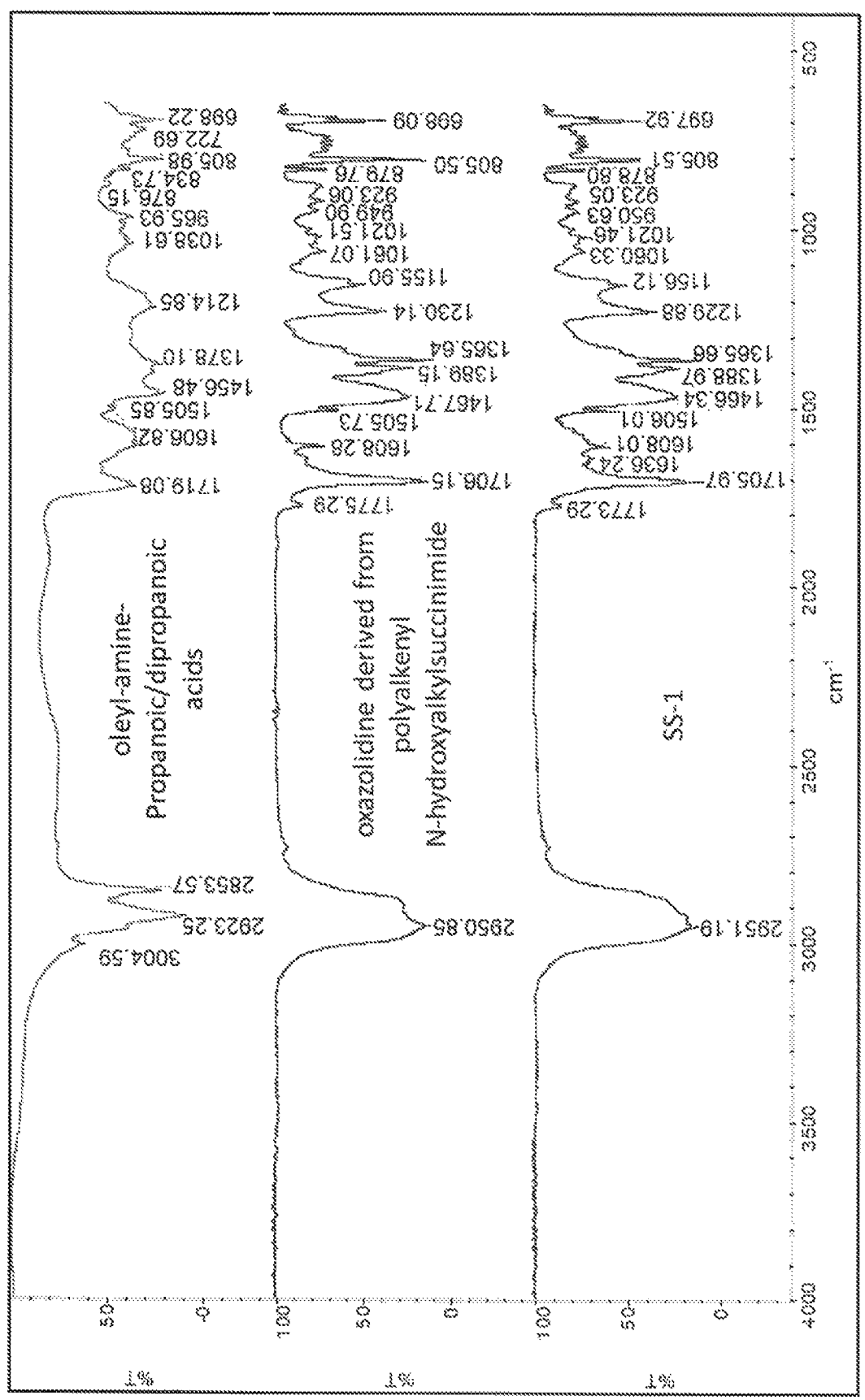
FIG. 6. Shows the comparative FT-IR spectra of the supramolecular surfactant, SS-1 obtained in the presence of solvent and their raw materials from Example 10.

The comparative FT-IR spectra of the supramolecular surfactant SS-1 with its raw materials are shown in FIG. 6.

Characterization by Nuclear Magnetic Resonance of Hydrogen-1 ($^1$H NMR): (CDCl$_3$), 600 MHz, δ (ppm): 5.21; 4.86; 4.25; 3.60; 3.25; 2.20; 1.70; 1.12 y 0.99.

Characterization by Nuclear Magnetic Resonance of Carbon-13 ($^{13}$C NMR): (CDCl$_3$), 50 MHz, δ (ppm): 179.70; 176.50; 175.51; 174.80; 86.77; 63.26; 59.33; 58.83; 58.21; 53.35; 52.15; 51.05; 50.01; 38.14; 32.43 y 15.65.

In the $^{13}$C NMR spectrum of the supramolecular surfactant SS-1, the chemical shifts corresponding to the carbonyl groups of the succinimide group are observed at 179.70 and 176.50 ppm, and those corresponding to the carbonyl group of the oleyl-amine propanoic/dipropanoic acids appear at 175.51 and 174.80. ppm. When we make the comparison with the spectra of the raw materials, it is found that in the $^{13}$C NMR spectrum of the oxazolidine derived from polyalkenyl N-hydroxyalkylsuccinimide with an average molecular weight of 1,116 Da, the signals of the carbonyl groups of the succinimide group appear at 179.64 and 176.42 ppm, which implies a high-field shift of these carbonyl groups concerning the shifts obtained in the $^{13}$C NMR spectrum of the supramolecular surfactant SS-1 (FIG. 6). Likewise, in the $^{13}$C NMR spectrum of the oleyl-amine propanoic/dipropanoic acids, it is observed that the signals of the carbonyl group appear at 175.38 and 174.69 ppm, which implies a displacement to low fields of these carbonyl groups concerning the displacements obtained in the $^{13}$C NMR spectrum of the supramolecular surfactant SS-1.

The variations observed in the chemical shifts of the carbonyl groups in the supramolecular surfactant concerning those obtained in the oxazolidine derived from polyalkenyl N-hydroxyalkylsuccinimide and in the mixture of oleyl-amine propanoic/dipropanoic acids that are used as raw materials, unequivocally demonstrate the formation of the supramolecular surfactant SS-1 and agree with what was found through FT-IR spectroscopy. It should be noted that chemical shifts of this type have been reported in the literature as experimental evidence to demonstrate that supramolecular assemblies exist. (A. Pastor, E. Martinez-Viviente. Coord. Chem. Rev. 2008, 252, 2314; P. S. Denkova, L. Van Lokeren, I. Verbruggen, R. Willem. J. Phys. Chem. B 2008, 112, 10935; M. Pons, P. Bernardó. Supramolecular Chemistry in Encyclopedia of Nuclear Magnetic Resonance, John Wiley & Sons. Ltd. Chichester, 2002, MX338862B).

Figure 7:
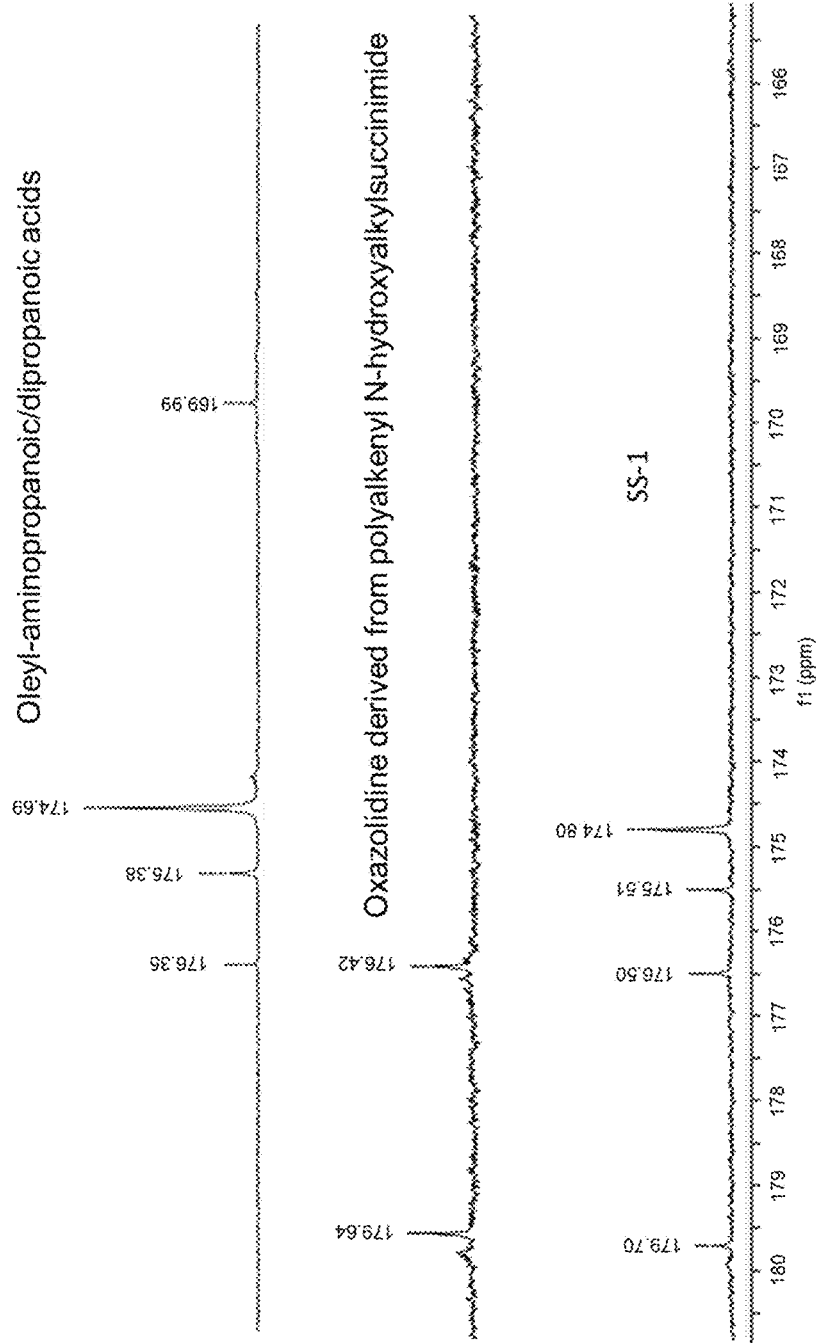
FIG. 7. Shows a representative comparison of the $^{13}C$ NMR spectra of the supramolecular surfactant, SS-1 and their raw materials from Example 10.

A representative comparison of the 13C NMR spectra of SS-1 and its raw materials is shown in FIG. 7.

Example 11. Preparation of supramolecular surfactant SS-2 (2:1 ratio) in the presence of a solvent. In a 100 ml round-bottom flask equipped with a magnetic stirrer, heating mantle, and thermometer, containing 34.9 g of oxazolidine derived from polyalkenyl N-hydroxyalkylsuccinimide with an average molecular weight of 1,116 Da, whose general structure is shown in (1), where m is equal to 1, n is equal to 0, $R_2$, $R_3$, $R_4$ and $R_5$ are —H groups, dissolved in light aromine at 55% of active, 6.38 g of the corrosion inhibitor, oleyl-amine-propanoic and oleyl-amine-dipropanoic acid base dissolved in light aromine at 40% of active were added; The mixture was stirred at 225 rpm for 60 minutes at an ambient temperature of 25° C. and atmospheric pressure; once the reaction time ended, 41.28 g of SS-2 were obtained as a viscous orange liquid.

FT-IR characterization: (cm$^{-1}$) 2,951; 2,884; 2,731; 1,776; 1,706; 1,607; 1,506; 1,467; 1,389; 1,365; 1,229; 1,156; 834; 806; 696.

In the FT-IR spectrum of the supramolecular surfactant SS-2, the symmetric and asymmetric tension bands of the succinimide group appear at 1,776 and 1,706 cm$^{-1}$, respectively; and the band of carbonyl groups corresponding to oleyl-amine propanoic/dipropanoic acids overlaps with the band of asymmetric tension of the succinimide group and appears at 1,706 cm$^{-1}$. In the infrared spectrum of the mixture of oleyl-amine propanoic/dipropanoic acids used as raw material for synthesizing supramolecular surfactant SS-2, the band of carbonyl groups appears at 1,717 cm$^{-1}$. A comparison of the wavenumbers found in both infrared spectra leads to the fact that this carbonyl group in the spectrum of the supramolecular surfactant SS-2 moves 11 cm$^{-1}$ to lower frequencies concerning the wavenumber found in the spectrum of oleyl-amine propanoic/dipropanoic acids used as raw material.

On the other hand, the symmetric and asymmetric tension bands of the succinimide group in the infrared spectrum of the oxazolidine derived from polyalkenyl N-hydroxyalkylsuccinimide with an average molecular weight of 1,116 Da that was used as raw material for the synthesis of the supramolecular surfactant SS-2 they appear at 1,775 and 1,706 cm$^{-1}$, respectively. The comparison of the wavenumbers of said bands of the succinimide group with the spectrum of the supramolecular surfactant SS-2 indicates that there is a displacement of 1 cm$^{-1}$ between the symmetric tension bands. The variations observed in the wavenumbers associated with the vibration frequencies in the succinimide and carbonyl groups in the supramolecular surfactant concerning those obtained in the oxazolidine derived from polyalkenyl N-hydroxyalkylsuccinimide and in the mixture of oleyl-amine propanoic/dipropanoics acids that are used as raw materials, unequivocally demonstrate the formation of the supramolecular surfactant SS-2.

It should be noted that displacements of this type have been reported in the literature as experimental evidence to demonstrate that supramolecular assemblies exist. (J. Donon, S. Habka, T. Very, F. Charnay-Pouget, M. Mons, D. J. Aitken, V. Brenner, E. Gloaguen. Chem. Phys. Chem. 2021, 22, 2442; S. Habka, T. Very, J. Donon, V. Vaquero-Vara, B. Tardivel, F. Charnay-Pouget, M. Mons, D. J. Aitken, V. Brenner. E. Gloaguen. Phys. Chem. Chem. Phys. 2019, 21, 12798; C. Chi, X. Li, Y. Zhang, L. Li, Z. Wang. Food Funct. 2017, 8, 720; M. Shirakawa, S. I. Kawano, N. Fujita, K. Sada, S. Shinkai. J. Org. Chem. 2003, 68, 5037; MX338862B).

Figure 8:
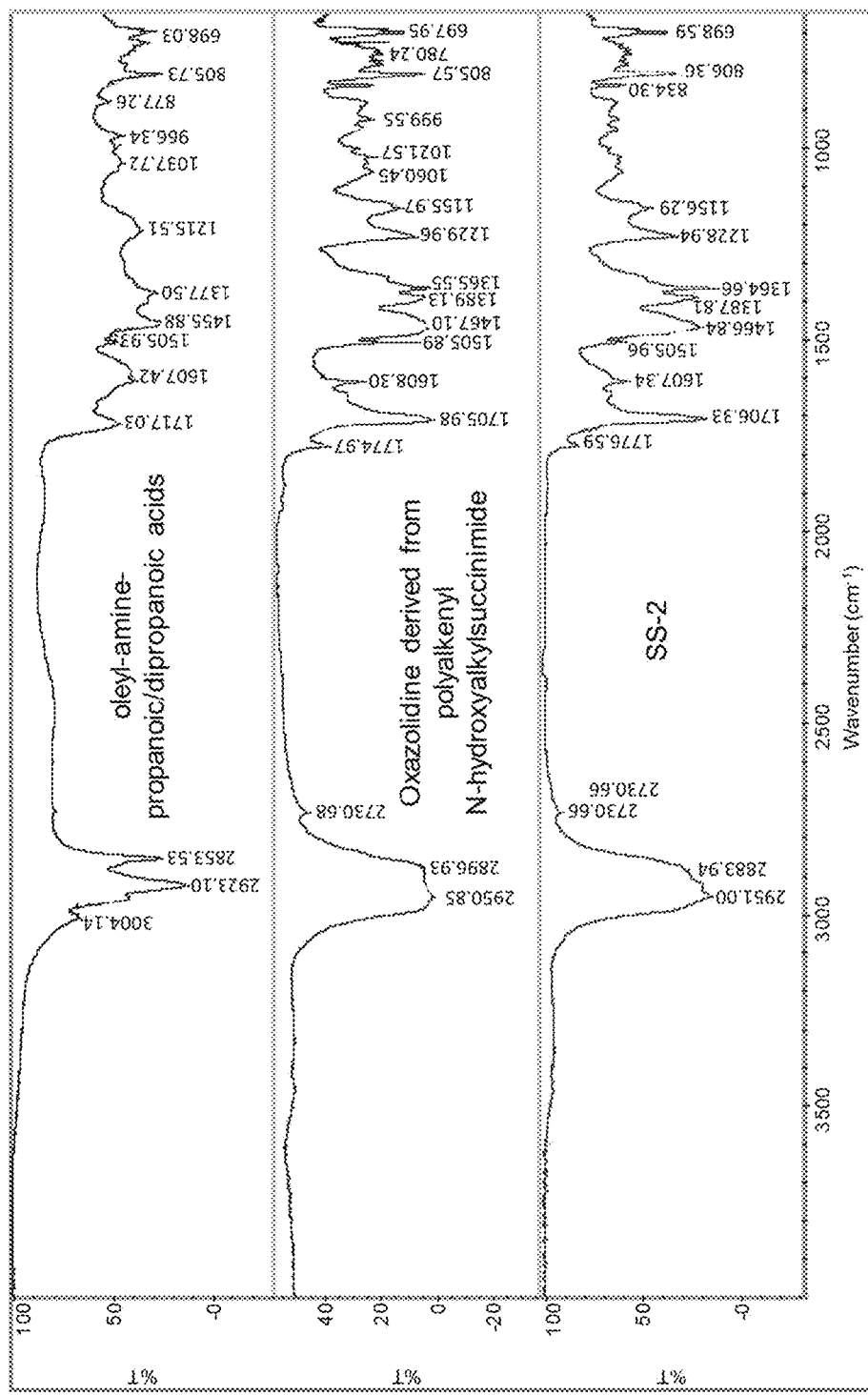
FIG. 8. Shows the comparative FT-IR spectra of the supramolecular surfactant, SS-2 with their raw materials.

The comparative FT-IR spectra of the supramolecular surfactant SS-2 with its raw materials are shown in FIG. 8.

Characterization by Nuclear Magnetic Resonance of Hydrogen-1 ($^1$H NMR): (CDCl$_3$), 600 MHz, δ (ppm): 5.21; 4.24; 3.60; 3.17; 2.94; 2.60; 1.42; 1.11 y 0.99.

Characterization by Nuclear Magnetic Resonance of Carbon-13 ($^{13}$C NMR): (CDCl$_3$), 600 MHz, δ (ppm): 179.70; 176.50; 174.80; 86.77; 63.26; 59.33; 58.83; 58.21; 53.35; 52.15; 51.05; 50.01; 38.14; 32.43 y 15.65.

In the $^{13}$C NMR spectrum of the supramolecular surfactant SS-2, the chemical shifts corresponding to the carbonyl groups of the succinimide group are observed at 179.71 and 176.50 ppm, and those corresponding to the carbonyl group of the oleyl-amine propanoic/dipropanoic acids appear at 175.67 and 174.95 ppm. When we make the comparison with the spectra of the raw materials, it is found that in the $^{13}$C NMR spectrum of the oxazolidine derived from polyalkenyl N-hydroxyalkylsuccinimide with an average molecular weight of 1,116 Da that is used as raw material, the signals of the carbonyl group appear at 179.64 and 176.42 ppm, which implies a high field displacement of these carbonyl groups concerning the displacements obtained in the $^{13}$C NMR spectrum of the supramolecular surfactant SS-2. Likewise, in the $^{13}$C NMR spectrum of the oleyl-amine propanoic/dipropanoic acids, it is observed that the signals of the carbonyl group appear at 175.38 and 174.69 ppm, which implies a displacement to low fields of these carbonyl groups concerning the displacements obtained, in the $^{13}$C NMR spectrum of the supramolecular surfactant SS-2.

Figure 9:
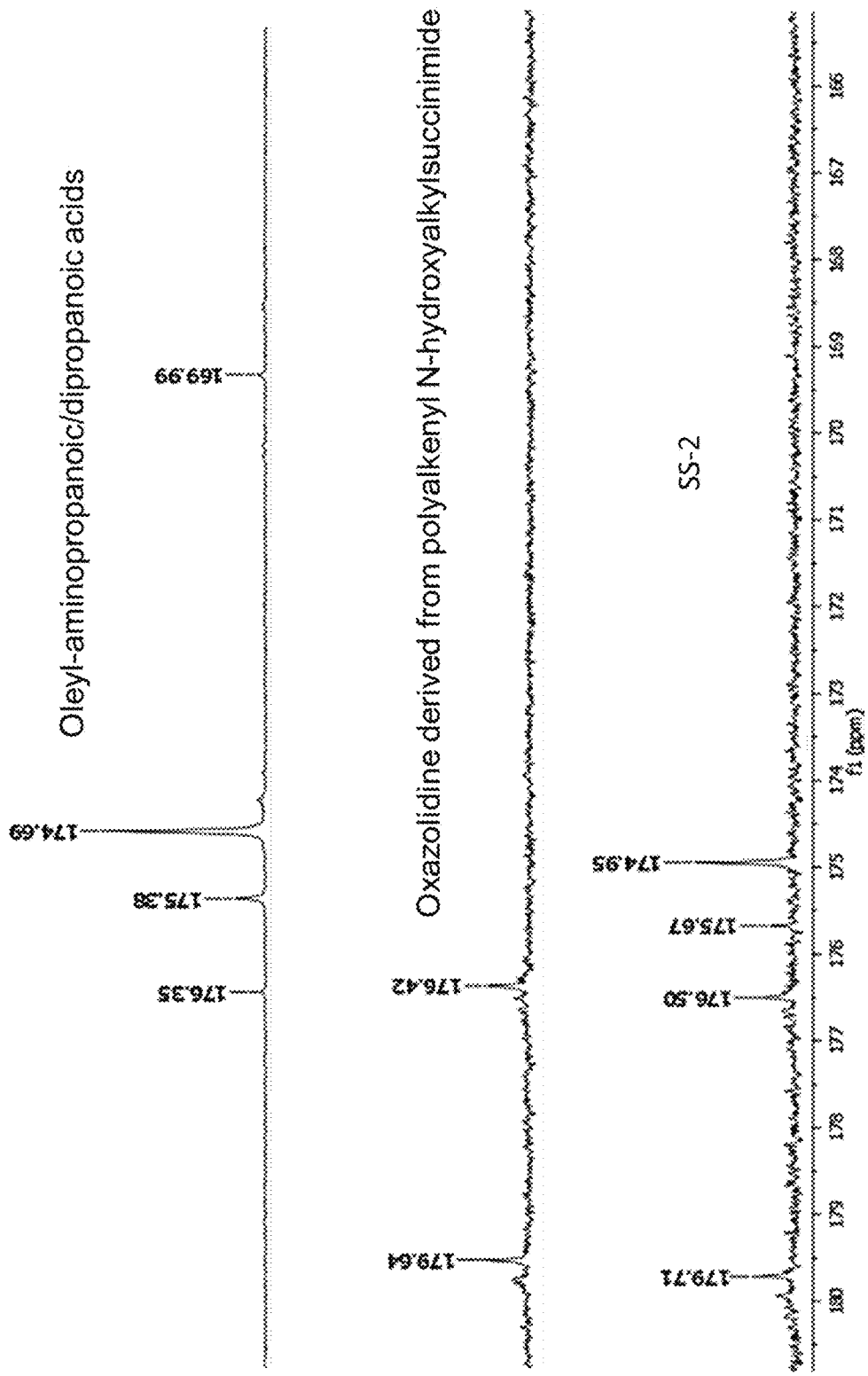
FIG. 9. Illustrates the comparative FT-IR spectra of supramolecular surfactant, SS-2 with their raw materials.

The variations observed in the chemical shifts of the carbonyl groups in the supramolecular surfactant concerning those obtained in the oxazolidine derived from polyalkenyl N-hydroxyalkylsuccinimide and in the mixture of oleyl-aminopropanoic/dipropanoic acids that are used as raw materials, unequivocally demonstrate the formation of the supramolecular surfactant SS-2 and agree with what was found through FT-IR spectroscopy. It should be noted that chemical shifts of this type have been reported in the literature as experimental evidence to demonstrate that supramolecular assemblies exist (A. Pastor, E. Martinez-Viviente. Coord. Chem. Rev. 2008, 252, 2314; P. S. Denkova, L. Van Lokeren, I. Verbruggen, R. Willem. J. Phys. Chem. B 2008, 112, 10935; M. Pons, P. Bernardó. Supramolecular Chemistry in Encyclopedia of Nuclear Magnetic Resonance, John Wiley & Sons. Ltd. Chichester, 2002, MX338862B). The comparative FT-IR spectra of the supramolecular surfactant SS-2 with its raw materials are shown in FIG. 9.

Example 12. Evaluation as a corrosion inhibitor and detergent-dispersant to deposit control. For supramolecular surfactants to fulfill the purposes described in the present invention, they must pass at low concentrations established tests of corrosion inhibition and control deposits in the intake valve of an internal combustion engine. For this, two tests were carried out, which are mentioned below:

A. Evaluation of corrosion inhibition by the NACE TM-0172 method. The NACE TM-0172 method, preventing rust in pipelines that transport petroleum distillate fuels, is a standardized procedure to determine the corrosion properties of chemical products with corrosion inhibitor properties in media such as gasoline, fuels, and other derived petroleum. To know if a specific chemical achieves this test is necessary to obtain a minimum rating of B++, which is achieved according to the following grading system:

| Rating | Percentage of surface corroded (%) |
|---|---|
| A | 0 |
| B++ | <0.1 (2 o 3 spots no more than 1 mm in diameter) |
| B+ | <5 |
| B | 5-25 |
| C | 25-50 |
| D | 50-745 |
| E | >75 |

B. Deposit control evaluation through the single-cylinder engine test. The objective of this method is to evaluate the formation of deposits in the intake valve of a 4 HP single-cylinder internal combustion engine in such a way that it is possible to determine the performance of dispersant detergent additives for gasoline. Each run has a time of 16 hours, a total of 20 liters of gasoline are consumed, and the engine speed is adjusted to 2,100±100 rpm. The amount of deposits obtained in the intake valve is quantified in milligrams, and the efficiency of the additive detergent dispersant evaluated is determined, taking as reference the deposits obtained when using gasoline without additives. It must have a minimum efficiency of 75% to pass this test. The supramolecular surfactants SS-1 and SS-2 prepared in examples 10 and 11 of the present invention were evaluated at different concentrations in the corrosion inhibition test by the NACE TM-0172 method and in the deposit control test through a single-cylinder engine, using Mexican gasoline PEMEX-Magna type free of additives.

The results of the efficiencies as a corrosion inhibitor and deposit control (detergent and dispersant property) of the supramolecular surfactants SS-1 and SS-2 of the present invention in the presence of Mexican gasoline PEMEX-Magna type free of additives are shown as follows:

| Supramolecular surfactant | Concentration (ppm) | Deposits control | | | Corrosion inhibition | |
|---|---|---|---|---|---|---|
| | | Reference deposits (ppm) | Deposits in the run (mg) | Efficiency (%) | Reference rating | Supramolecular surfactants rating |
| SS-1 | 2.8 | 7.5 | 2 | 73.3 | D | A |
| | 5.60 | 7.7 | 1 | 87.0 | D | A |
| | 22.44 | 7.5 | 1.2 | 84.0 | D | A |
| SS-2 | 4.85 | 7.7 | 0.6 | 92.0 | D | B++ |
| | 10.08 | 7.5 | 1.1 | 85.7 | D | A |
| | 38.82 | 7.5 | 0.9 | 88.0 | D | A |

The results show that the supramolecular surfactant SS-1 passes both tests from concentrations of 5.6 ppm, while the supramolecular surfactant SS-2 passes both tests from concentrations of 4.85 ppm.

It is important to emphasize that the supramolecular surfactants of the present invention have several advantages over the oxazolidines derived from polyalkyl or polyalkenyl N-hydroxyalkyl succinimides protected in patent MX269419B; since the supramolecular surfactants of this document are multifunctional and pass the tests for corrosion inhibition and control of deposits in single-cylinder engines, while in the case of oxazolidines derived from polyalkyl or polyalkenyl N-hydroxyalkyl succinimides of patent MX269419B, the only evidence is presented that it passes the single-cylinder engine deposit control test. In addition to the above, patent MX269419B indicates that to pass the deposit control test in a single-cylinder engine, concentrations of at least 85 ppm of oxazolidines derived from polyalkyl or polyalkenyl N-hydroxyalkyl succinimides are required, while in the present invention, supramolecular surfactant dosages of at least 4.85 ppm are needed, which represents a great competitive advantage of our supramolecular surfactants concerning oxazolidines derived from polyalkyl or polyalkenyl N-hydroxyalkyl succinimides of patent MX269419B. Likewise, the supramolecular surfactants of this invention have advantages over the N-alkyl or N-alkenyl or N-cycloalkyl, or N-aryl amino or imino propionic acids protected in patent MX 319760 because they pass the inhibition tests against corrosion by the NACE TM-0172 method and deposit control method, while in the case of N-alkyl or N-alkenyl or N-cycloalkyl or N-aryl amino or imino propionic acids of patent MX 319760, the only evidence is given that it passes the NACE TM-0172 corrosion inhibition test. In addition to the above, patent MX 319760B indicates that to pass the corrosion inhibition test by the NACE TM-0172 method in gasoline, at least 5 ppm of N-alkyl or N-alkenyl or N-cycloalkyl is required or N-aryl amino or imino propionic acids and their formulations. In contrast, in the case of the supramolecular surfactants of the present invention, dosages of at least 2.8 ppm are required, which represents a great competitive advantage of our supramolecular surfactants concerning the N-alkyl or N-alkenyl or N-cycloalkyl or N-aryl amino or imino propionic acids and their formulations from patent MX 319760B. The evidence presented shows that it is feasible to apply our supramolecular surfactants to prevent and control the formation of deposits in internal combustion engines, as well as to prevent and protect against corrosion pipelines, tanks, and metallic components of internal combustion engines that are in contact with hydrocarbons or liquid fuels.

Example 13. Determination of interfacial tension of the supramolecular surfactants. The interfacial tension value measurement was made in Gasoline/Water (G/W) system using an optical-mechanical instrument DSA-100, Kruss, employing the pendant drop technique (FIG. 1). The interfacial tension (IT) of the pendant drop analytical technique is a method that uses the intensive properties of the Gasoline-Water (G-W) system to determine the presence and/or the supramolecular surfactant concentration in the gasoline to study. The measurements are made at a temperature of 20±2° C., and the supramolecular surfactant concentrations in the Mexican gasoline type are from 0.5-600 ppm, preferably from 4 to 240 ppm. The interfacial tension (IT) of the water-gasoline system at 20±2° C. is 25±5 mN/m, whereby the changes associated with IT of the water-gasoline-supramolecular surfactant system only depend on the supramolecular surfactant concentration and their chemical structure; whereby, the IT values are in the interval from 1 to 30 mN/m.

The general process consists of a first stage in determining the interfacial tension (IT) of the gasoline-water system free of supramolecular surfactant, later the gasoline is additived with supramolecular surfactant at a determined concentration and is generated a drop of distilled water in the gasoline additived with supramolecular surfactant medium. Finally, the system is allowed to equilibrate. It is determined that the interfacial tension (IT) at the established time, for the specific case of the supramolecular surfactants of the present invention, is 90 minutes. This process is repeated at different concentrations of supramolecular surfactants, with the aim to generate the corresponding equations that allow determine the critic micellar concentration of the supramolecular surfactant in the water-gasoline-supramolecular surfactant system and to have a process that allows determining the supramolecular surfactant concentrations in sample test of gasoline wherein the supramolecular surfactant concentration is unknown.

The interfacial tension results for the supramolecular surfactants SS-2 and SS-2 described in examples 10 and 11 at different concentrations are presented.

| Supramolecular surfactant | | | |
|---|---|---|---|
| SS-1 | | SS-2 | |
| Concentration (ppm) | Interfacial tension (mN/m) | Concentration (ppm) | Interfacial tension (mN/m) |
| 4 | 7.800 | 4 | 15.000 |
| 19 | 6.085 | 8 | 13.600 |
| 37 | 4.405 | 16 | 11.675 |
| 60 | 3.335 | 32 | 9.530 |
| 80 | 2.96 | 48 | 7.660 |
| 100 | 2.655 | 65 | 4.720 |
| 120 | 2.565 | 80 | 3.280 |
| 150 | 2.26 | 100 | 1.750 |
| 180 | 2.025 | 140 | 1.450 |
| 240 | 1.14 | 165 | 1.280 |
| — | — | 200 | 1.090 |
| — | — | 240 | 0.910 |

Figure 2:
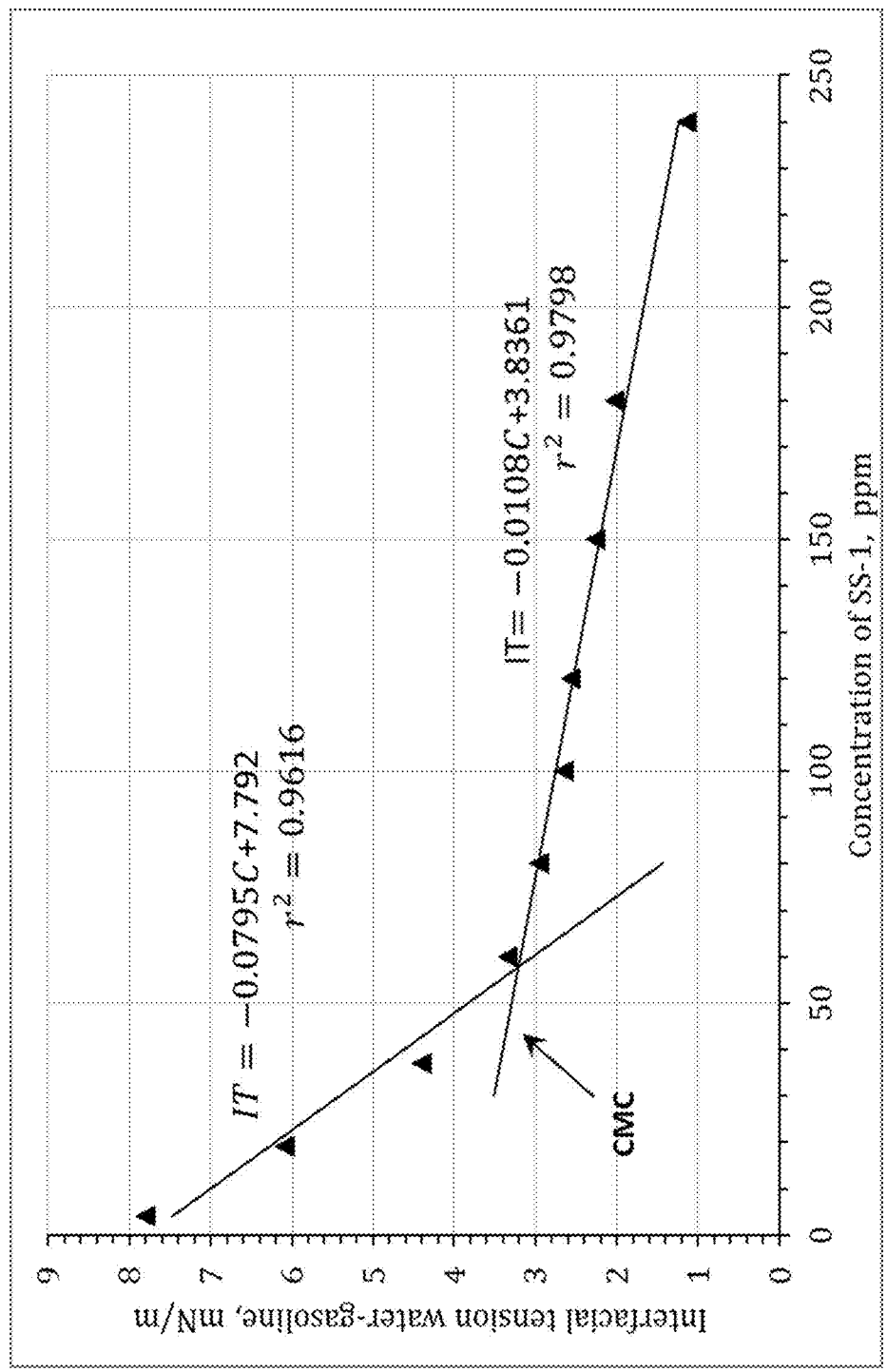
FIG. 2. Displays the graph of interfacial tension vs. concentration of the supramolecular surfactant, SS-1.
Figure 3:
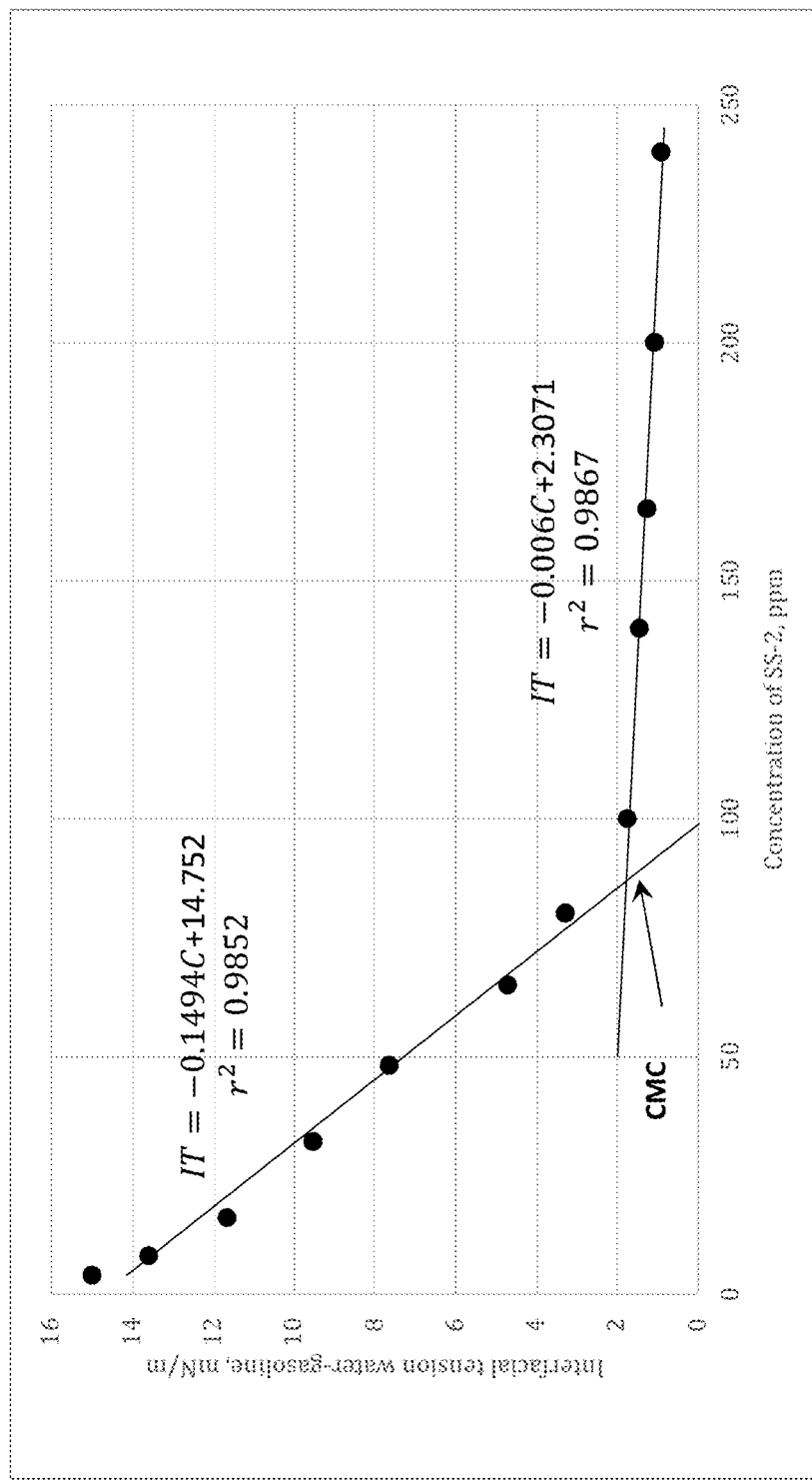
FIG. 3. Presents the graph of interfacial tension vs. concentration of the supramolecular surfactant, SS-2.

FIGS. 2 and 3 present the interfacial tension behavior graphically in the function of the concentration of supramolecular surfactants SS-1 and SS-2, respectively. A decrease in the interfacial tension is observed as the concentration of supramolecular surfactant increases, and it is a function of the supramolecular surfactant chemical structure.

It is observed that there are two regions in the interfacial tension graphics against supramolecular surfactant concentration; the first corresponds to the values of interfacial tension below the critical micellar concentration (CMC), and the second corresponds to the values after the CMC. Two different slopes exist wherein it is possible to calculate the supramolecular surfactant concentration in the function of his interfacial tension value. In such a way, determining the supramolecular surfactant concentration dissolved in the gasoline is possible by employing some of the linear equations below or after CMC through this property.

With the aim to demonstrate that it is feasible determining the supramolecular surfactant concentration in gasoline through the process of the determination of interfacial tension of gasoline/water system and the use of the generated equations was prepared for the case of supramolecular surfactant SS-1, a sample in Mexican gasoline Pemex-Magna additive free type with a known concentration of 50.1 ppm, later was determined the interfacial tension through of the previous process described, obtaining a value of 3.65 mN/m. The interfacial tension obtained value conforms to established in FIG. 2, was introduced in the equation to values lower than CMC obtaining a value of 52.1 ppm, which compared with the value of the known concentration has a difference of −2 ppm, what it entails an error of 3.99% and confirms that it is feasible determining the supramolecular surfactant concentration in gasoline through the determination process of interfacial tension of the gasoline/water system. Similarly, in the case of the supramolecular surfactant SS-2, it was prepared a sample in Mexican gasoline PEMEX-Magna free additive type with a known concentration of 65.0 ppm, later was determined his interfacial tension through the described process, obtaining a value of 5.46 mN/m. The interfacial tension value obtained according to established in FIG. 3 and was introduced in the equation to values low than CMC, obtaining a value of 62.2 ppm, which compared with the value of the known concentration gives a difference of 2.8 ppm, what it entails an error of 4.29% and confirms that it is feasible determining the concentration of supramolecular surfactant in gasoline through the determination method of interfacial tension of the gasoline/water system.

The invention claimed is:

1. A supramolecular surfactant with detergent-dispersant and corrosion inhibition properties characterized by the non-covalent condensate formula A:B of components A and B wherein:

Component A is a compound of structural formula (1):

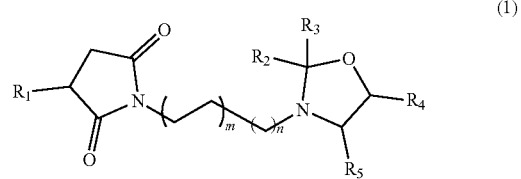

(1)

wherein $R_1$ is an alkenyl or polyalkenyl group of average molecular weight in the interval between 400 and 5,000 Da;

m is an integer number between 1 and 5;

n is an integer number between 0 and 1;

$R_2$, $R_3$, $R_4$, and $R_5$ are any of the following independent substituents: —H, —$CH_2(CH_2)_uV$, —$C_6H_3WX$, or —$C_{10}H_4YZ$, wherein U is an integer number between 0 and 8;

V is any of the substituents —H, —$NH_2$, —OH, y-COOH; and

W, X, Y, and Z are independent substituents selected of the following groups: linear or branched alkyl chain containing from 1 to 6 carbon atoms, —OH, —$NH_2$, aromatic, methoxy, ethylene oxide, propylene oxide, —COOH, or $SO_3$;

Component B is a mixture of compounds of structural formula (2a) and (2b):

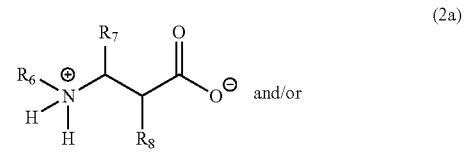

(2a) and/or (2b)

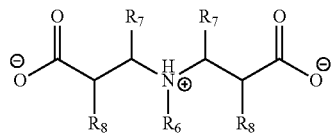

wherein:

R₆ is a linear or branched alkyl or alkenyl chain that contains from 1 to 30 carbon atoms, or a cycloalkyl or aryl group that can contain from 5 to 12 carbon atoms;

R₇ is the substituent —H; and

R₁ is the substituent —H or —CH₃;

and, the compounds of structural formula (2a) and (2b) are in equilibrium with compounds of structural formulas (3a) and (3b), respectively, as shown below:

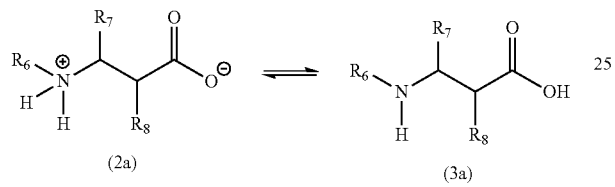

(2a)      (3a)

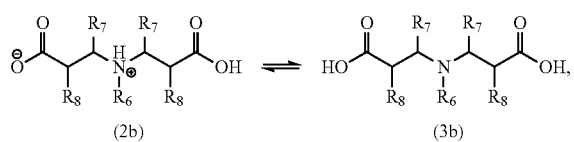

(2b)      (3b)

wherein components A and B are in a molar ratio from 0.1:10 to 10:0.1, and wherein the surfactant has a supramolecular structure of any one of formulas (4a), (4b), (5a), (5b), (6a), and (6b):

(4a)

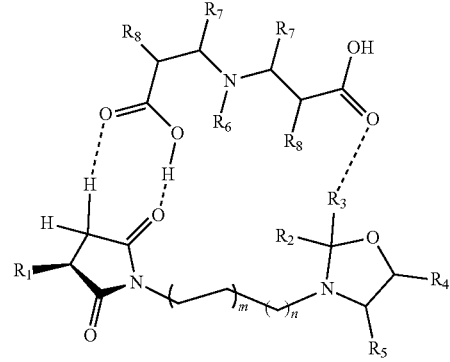

and/or (4b)

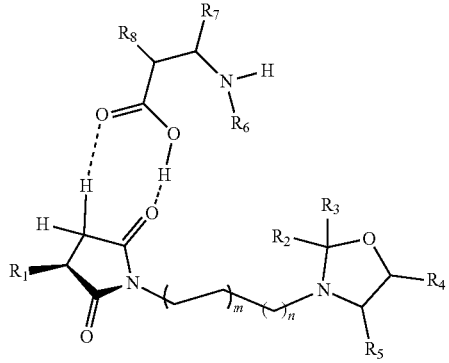

(5a)

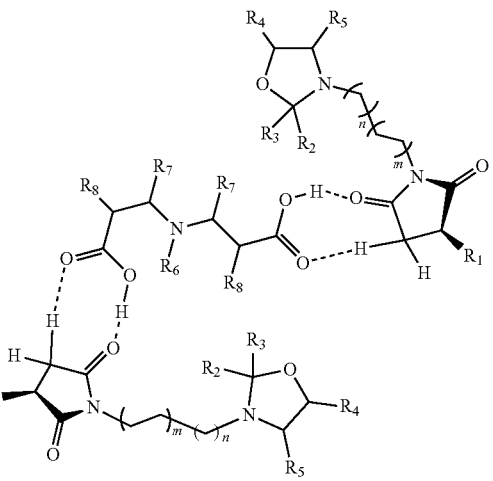

and/or (5b)

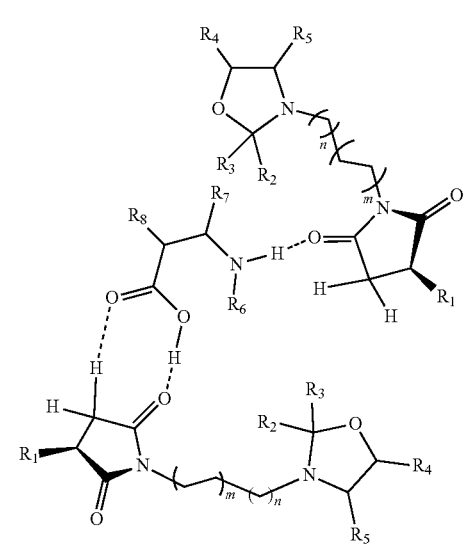

-continued

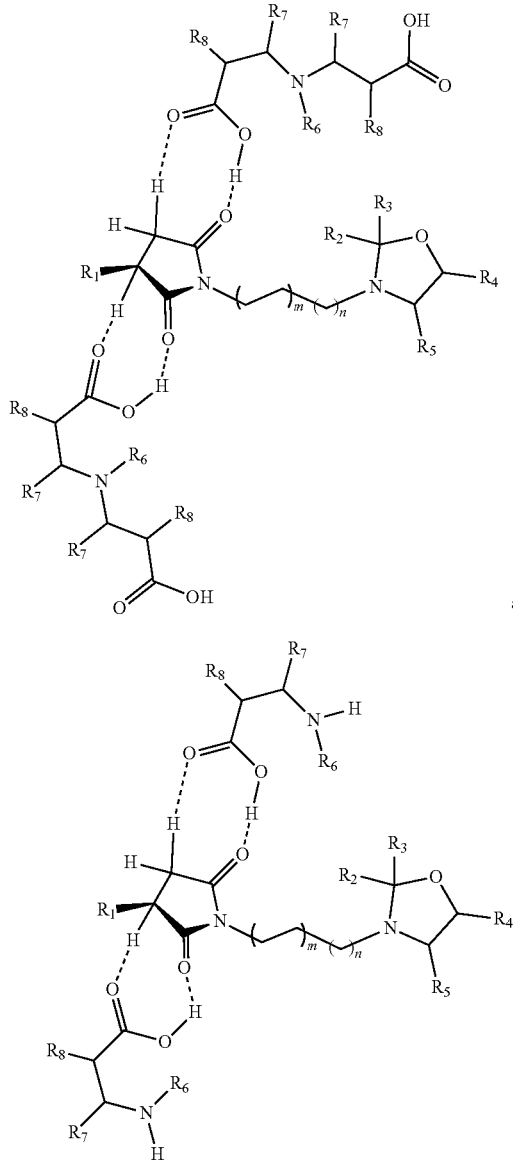

2. A process to prepare a supramolecular surfactant with detergent-dispersant and corrosion inhibition properties characterized by the non-covalent condensate formula A:B of components A and B wherein:

Component A is a compound of structural formula (1):

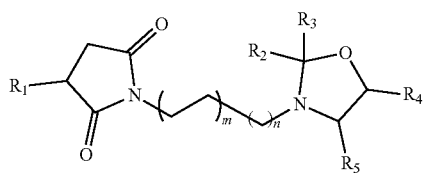

wherein
$R_1$ is an alkenyl or polyalkenyl group of average molecular weight in the interval between 400 and 5,000 Da;
m is an integer number between 1 and 5;
n is an integer number between 0 and 1;
$R_2$, $R_3$, $R_4$, and $R_5$ are any of the following independent substituents: —H, —$CH_2$ $(CH_2)_uV$, —$C_6H_3WX$, or —$C_{10}H_4YZ$, wherein
U is an integer number between 0 and 8;
V is any of the substituents —H, —$NH_2$, —OH, y-COOH; and
W, X, Y, and Z are independent substituents selected of the following groups: linear or branched alkyl chain containing from 1 to 6 carbon atoms, —OH, —$NH_2$, aromatic, methoxy, ethylene oxide, propylene oxide, —COOH, or $SO_3$;

Component B is a mixture of compounds of structural formula (2a) and (2b):

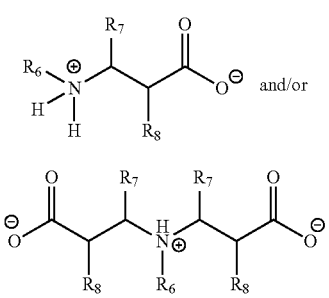

wherein:
$R_6$ is a linear or branched alkyl or alkenyl chain that contains from 1 to 30 carbon atoms, or a cycloalkyl or aryl group that can contain from 5 to 12 carbon atoms;
$R_7$ is the substituent —H; and
$R_1$ is the substituent —H or —$CH_3$:

and, the compounds of structural formula (2a) and (2b) are in equilibrium with compounds of structural formulas (3a) and (3b), respectively, as shown below:

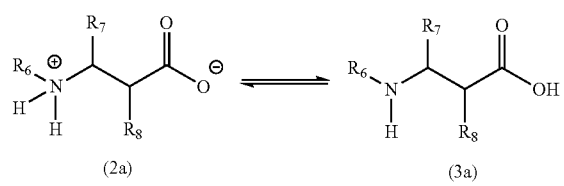

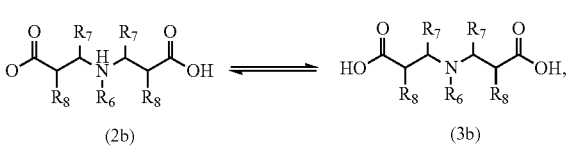

the process comprising mixing the stoichiometric amounts of components A and B at atmospheric pressure, and optionally without solvent, wherein component A and component B are mixed in a molar ratio from 0.1:10 to 10:0.1 with stirring for 10-240 minutes at a temperature of from 10-120° C.

3. The process of claim 2, wherein component A and component B are mixed in a molar ratio from between 4:5 to 1:1 with stirring for 10-120 minutes at a temperature of from 10-90° C.

4. A process to prepare a supramolecular surfactant with detergent-dispersant and corrosion inhibition properties characterized by the non-covalent condensate formula A:B of components A and B wherein:

Component A is a compound of structural formula (1):

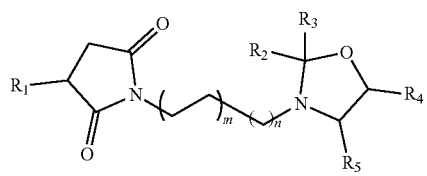

(1)

wherein
- $R_1$ is an alkenyl or polyalkenyl group of average molecular weight in the interval between 400 and 5,000 Da;
- m is an integer number between 1 and 5;
- n is an integer number between 0 and 1;
- $R_2$, $R_3$, $R_4$, and $R_5$ are any of the following independent substituents:—H, —$CH_2$ $(CH_2)_u$V, —$C_6H_3$WX, or —$C_{10}H_4$YZ, wherein
- U is an integer number between 0 and 8;
- V is any of the substituents —H, —$NH_2$, —OH, y-COOH; and
- W, X, Y, and Z are independent substituents selected of the following groups: linear or branched alkyl chain containing from 1 to 6 carbon atoms, —OH, —$NH_2$, aromatic, methoxy, ethylene oxide, propylene oxide, —COOH, or $SO_3$;

Component B is a mixture of compounds of structural formula (2a) and (2b):

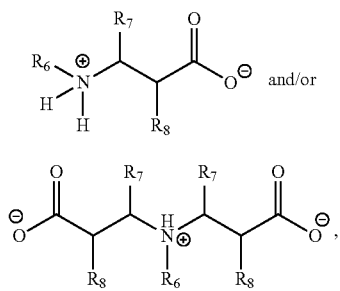

and/or (2a)

(2b)

wherein:
- $R_6$ is a linear or branched alkyl or alkenyl chain that contains from 1 to 30 carbon atoms, or a cycloalkyl or aryl group that can contain from 5 to 12 carbon atoms;
- $R_7$ is the substituent —H; and
- $R_1$ is the substituent —H or —$CH_3$:

and, the compounds of structural formula (2a) and (2b) are in equilibrium with compounds of structural formulas (3a) and (3b), respectively, as shown below:

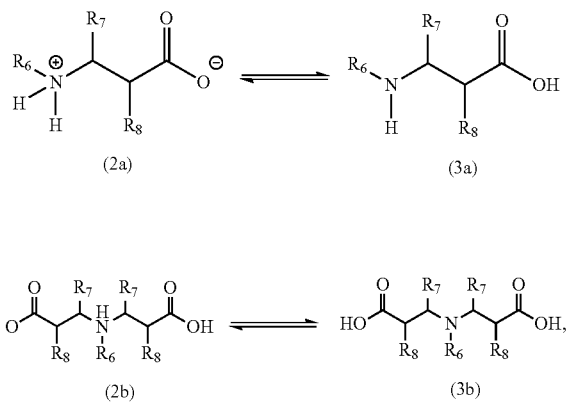

(2a)  (3a)

(2b)  (3b)

the process comprising mixing the stoichiometric amounts of components A and B at atmospheric pressure, wherein the process is carried out in the presence of an organic solvent in a ratio by weight of the solvent to the supramolecular surfactant of about 10% to 80%, wherein the solvent is selected from the group consisting of: benzene, xylene, xylenes, toluene, light aromatic naphtha, heavy aromatic naphtha, diesel, gasoline, chloroform, and an aromatics mixture.

5. The supramolecular surfactant of claim 1, wherein components A and B are in a molar ratio from 4:5 to 1:1.

6. The process of claim 4, wherein the process is carried out in the presence of the organic solvent in a ratio by weight of the solvent to the supramolecular surfactant of about 20% to 70%.

* * * * *